(12) United States Patent
Van De Poel et al.

(10) Patent No.: US 12,311,301 B2
(45) Date of Patent: May 27, 2025

(54) FILTER ELEMENT AND METHOD OF MANUFACTURING A FILTER ELEMENT

(71) Applicant: Donaldson Company, Inc., Bloomington, MN (US)

(72) Inventors: Gunther Van De Poel, Waanrode (BE); Bart Catoor, Kessel-Lo (BE); Mathijs Verstraete, Tienen (BE)

(73) Assignee: Donaldson Company, Inc., Bloomington, MN (US)

( * ) Notice: Subject to any disclaimer, the term of this patent is extended or adjusted under 35 U.S.C. 154(b) by 123 days.

(21) Appl. No.: 18/263,072

(22) PCT Filed: Jan. 27, 2022

(86) PCT No.: PCT/US2022/014106
§ 371 (c)(1),
(2) Date: Jul. 26, 2023

(87) PCT Pub. No.: WO2022/165042
PCT Pub. Date: Aug. 4, 2022

(65) Prior Publication Data
US 2024/0109012 A1      Apr. 4, 2024

(30) Foreign Application Priority Data
Jan. 27, 2021   (EP) .................................... 21153828

(51) Int. Cl.
*B01D 46/00* (2022.01)
*B01D 46/52* (2006.01)

(52) U.S. Cl.
CPC ....... *B01D 46/0001* (2013.01); *B01D 46/527* (2013.01); *B01D 2265/05* (2013.01);
(Continued)

(58) Field of Classification Search
CPC ...... B01D 46/525–527; B01D 46/0001; B01D 2271/02; B01D 2271/022;
(Continued)

(56) References Cited

U.S. PATENT DOCUMENTS

| | | |
|---|---|---|
| 5,820,646 A | 10/1998 | Gillingham et al. |
| 6,350,291 B1 | 2/2002 | Gieseke et al. |

(Continued)

FOREIGN PATENT DOCUMENTS

| | | |
|---|---|---|
| CN | 1590746 | 3/2005 |
| CN | 109414640 | 3/2019 |

(Continued)

OTHER PUBLICATIONS

International Search Report and Written Opinion for PCT/US2022/014106, dated May 4, 2022.

*Primary Examiner* — Robert Clemente
(74) *Attorney, Agent, or Firm* — Merchant & Gould P.C.

(57) ABSTRACT

The present disclosure relates to a filter element comprising a filter medium pack and a support arrangement comprising at least a shell member, and wherein a portion of the shell member is thermally welded to a circumferential face of the filter medium pack. The present disclosure further relates to a method of manufacturing such a filter element, the method comprising heating at least a portion of the shell member of the support arrangement, positioning the shell member around the circumferential face of the filter medium pack, pushing the heated circumferential portion of the shell member against the circumferential face of the filter medium pack, and allowing the circumferential portion of the shell member to cool down.

20 Claims, 22 Drawing Sheets

(52) U.S. Cl.
CPC .. *B01D 2271/025* (2013.01); *B01D 2271/027* (2013.01); *B01D 2275/105* (2013.01); *B01D 2275/208* (2013.01); *B01D 2277/30* (2013.01)

(58) Field of Classification Search
CPC ........ B01D 2271/025; B01D 2271/027; B01D 2275/105; B01D 2275/208; B01D 2277/30; B01D 2265/05
See application file for complete search history.

(56) References Cited

U.S. PATENT DOCUMENTS

| | | | |
|---|---|---|---|
| 7,396,376 | B2 | 7/2008 | Schrage et al. |
| 7,674,308 | B2 | 3/2010 | Krisko et al. |
| 8,206,625 | B2 * | 6/2012 | Brown ................ F02M 35/024 264/261 |
| 8,292,983 | B2 | 10/2012 | Reichter et al. |
| 8,685,128 | B2 | 4/2014 | Schrage et al. |
| 10,376,823 | B2 | 8/2019 | Krull et al. |
| 10,569,211 | B2 | 2/2020 | Merritt et al. |
| 2002/0100262 | A1 | 8/2002 | Gieseke et al. |
| 2006/0037296 | A1 | 2/2006 | Duffy |
| 2007/0261662 | A1 | 11/2007 | Lampert et al. |
| 2009/0320424 | A1 | 12/2009 | Merritt et al. |
| 2010/0044297 | A1 | 2/2010 | Krogue |
| 2012/0311983 | A1 | 12/2012 | Swanson et al. |
| 2013/0152524 | A1 | 6/2013 | Gensler et al. |
| 2014/0260139 | A1 | 9/2014 | Merritt |
| 2017/0333818 | A1 | 11/2017 | Way |
| 2018/0318745 | A1 | 11/2018 | Nichols et al. |
| 2018/0369735 | A1 | 12/2018 | Decoster et al. |
| 2019/0209960 | A1 | 7/2019 | Luchesi De Almeida et al. |
| 2020/0108342 | A1 | 4/2020 | Holm et al. |
| 2022/0288522 | A1 | 9/2022 | Verstraete et al. |

FOREIGN PATENT DOCUMENTS

| | | |
|---|---|---|
| EP | 0685251 | 12/1995 |
| EP | 1796814 | 6/2007 |
| EP | 2140922 | 10/2019 |
| EP | 3680002 A1 | 7/2020 |
| EP | 4035757 | 8/2022 |
| WO | 9912629 | 3/1999 |
| WO | 2011115973 | 9/2011 |
| WO | 2011157680 | 12/2011 |
| WO | 2021006927 | 1/2021 |
| WO | 2021021655 | 2/2021 |

* cited by examiner

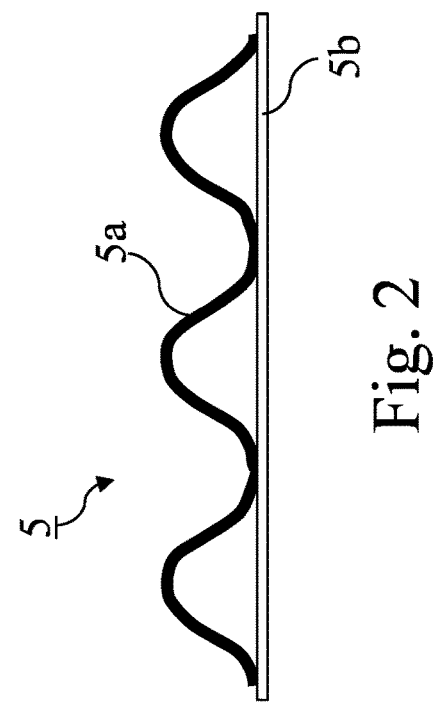
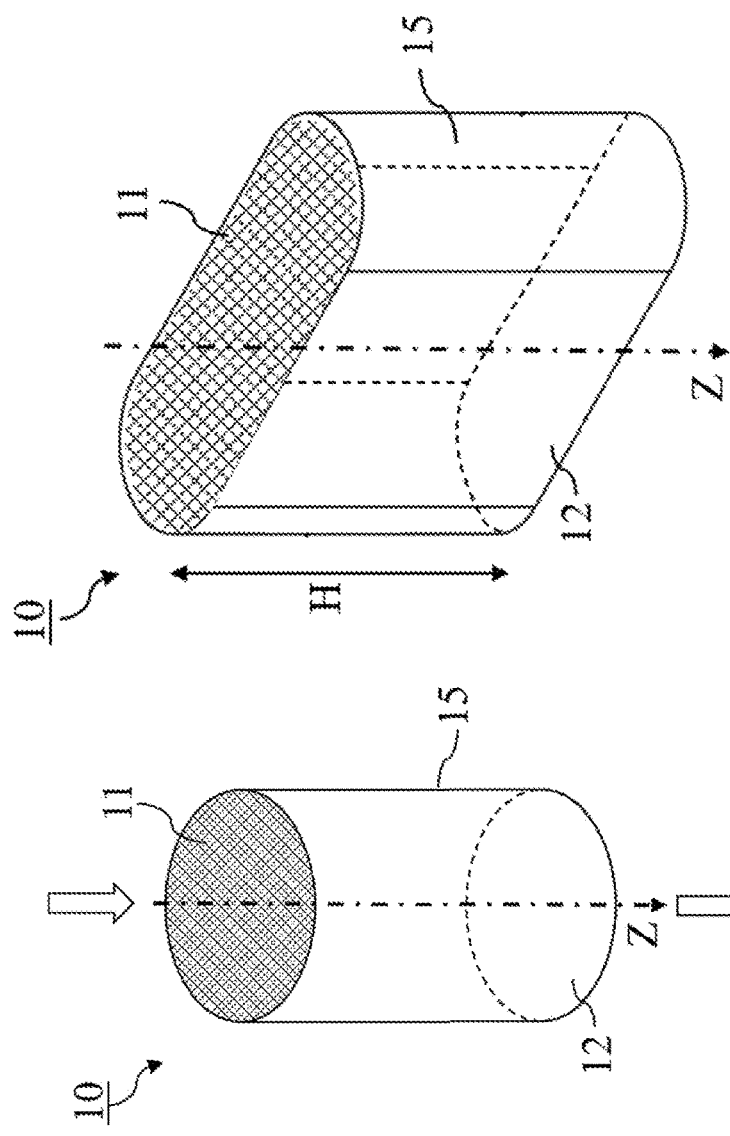

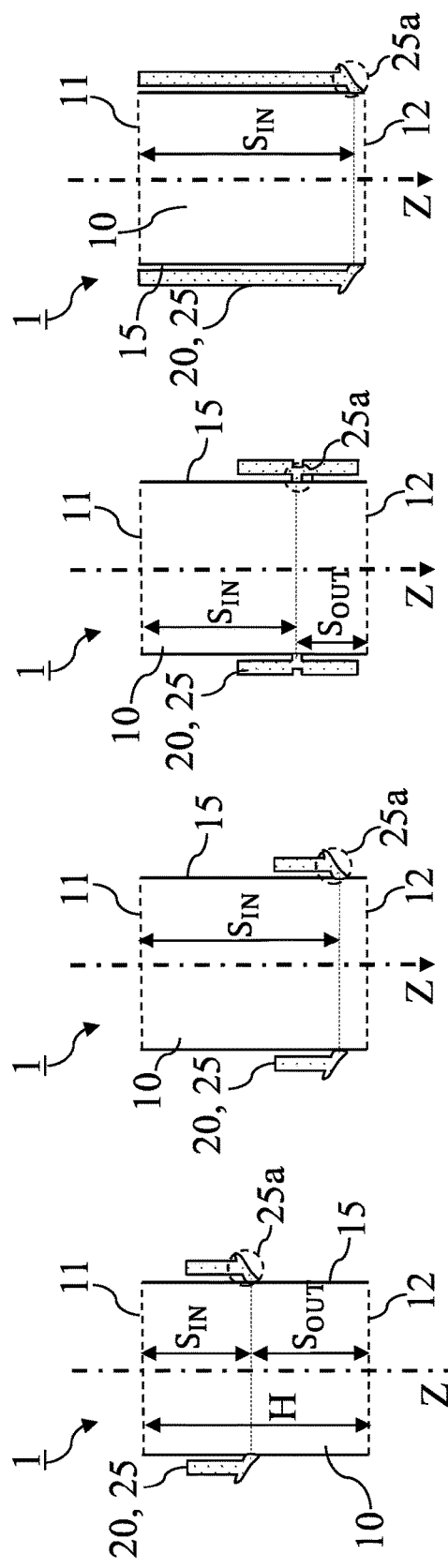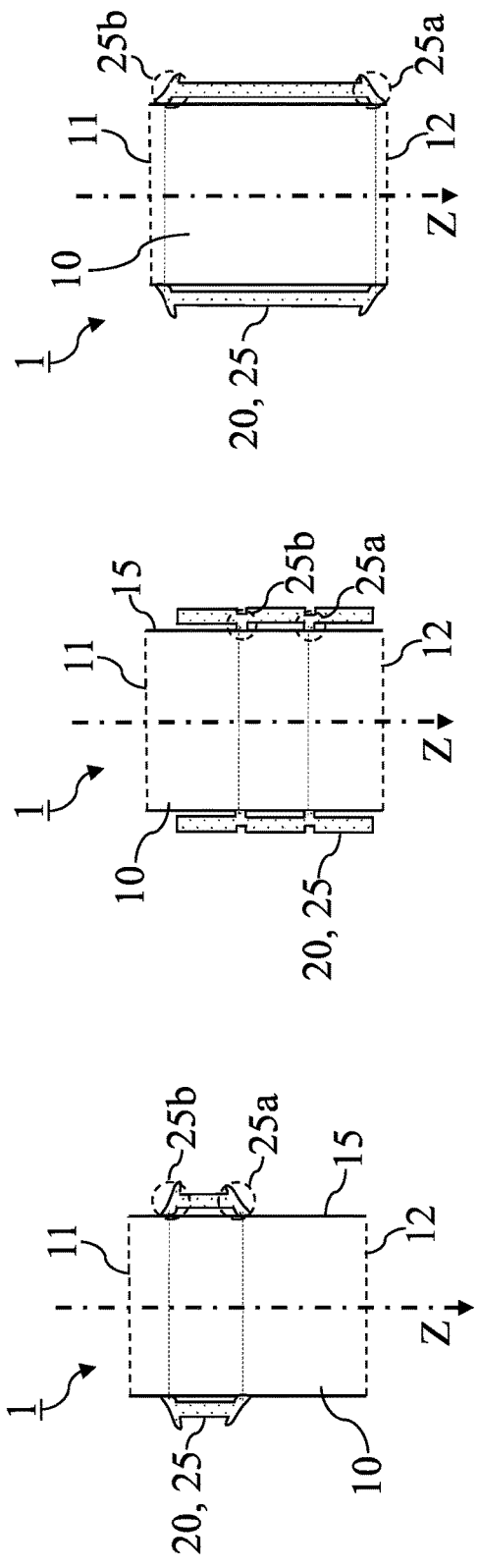

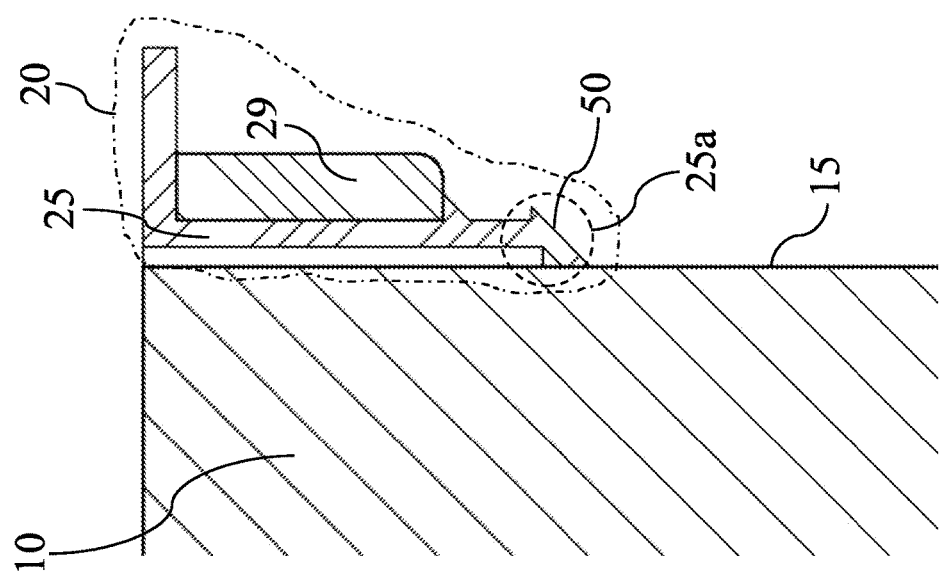
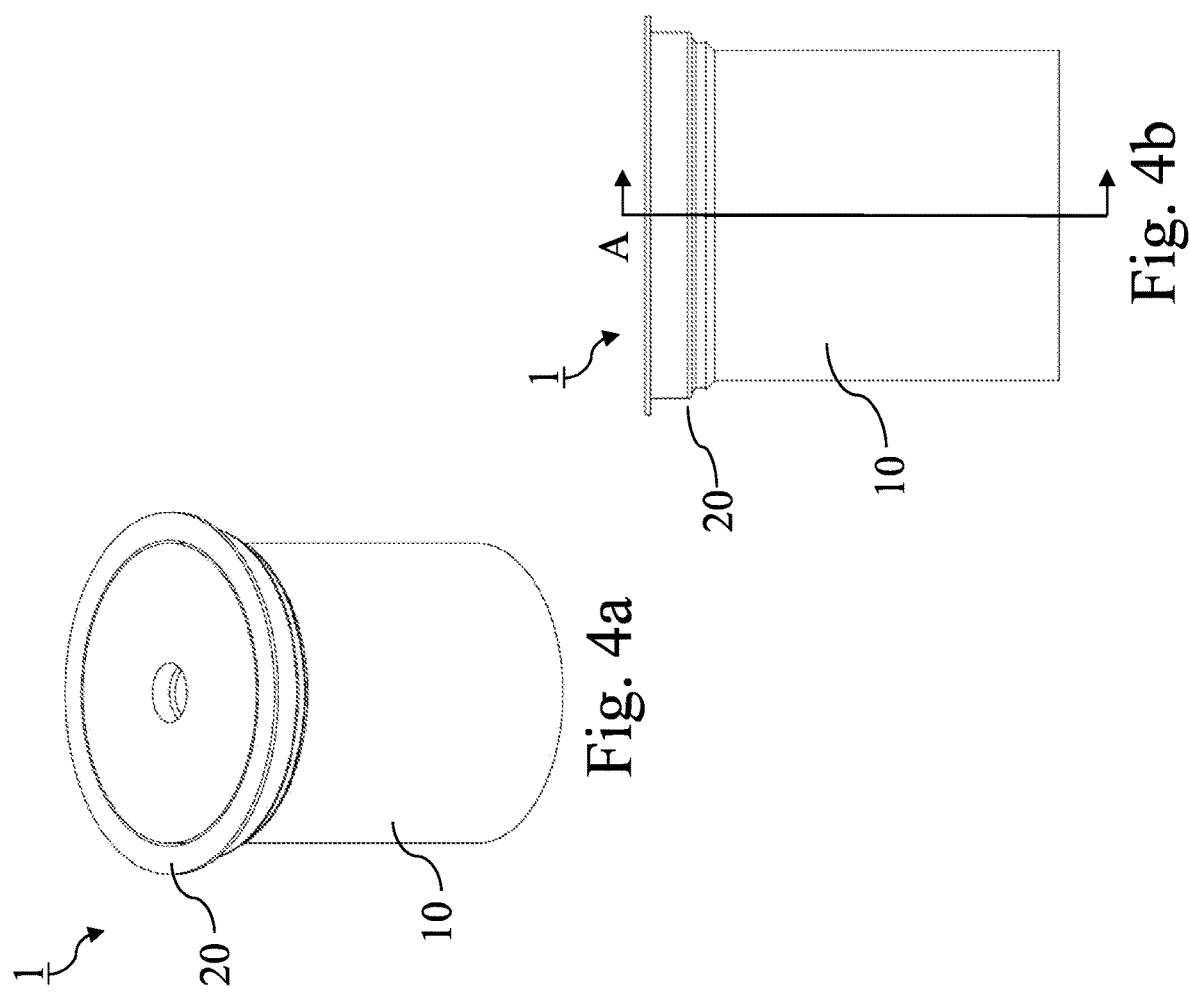

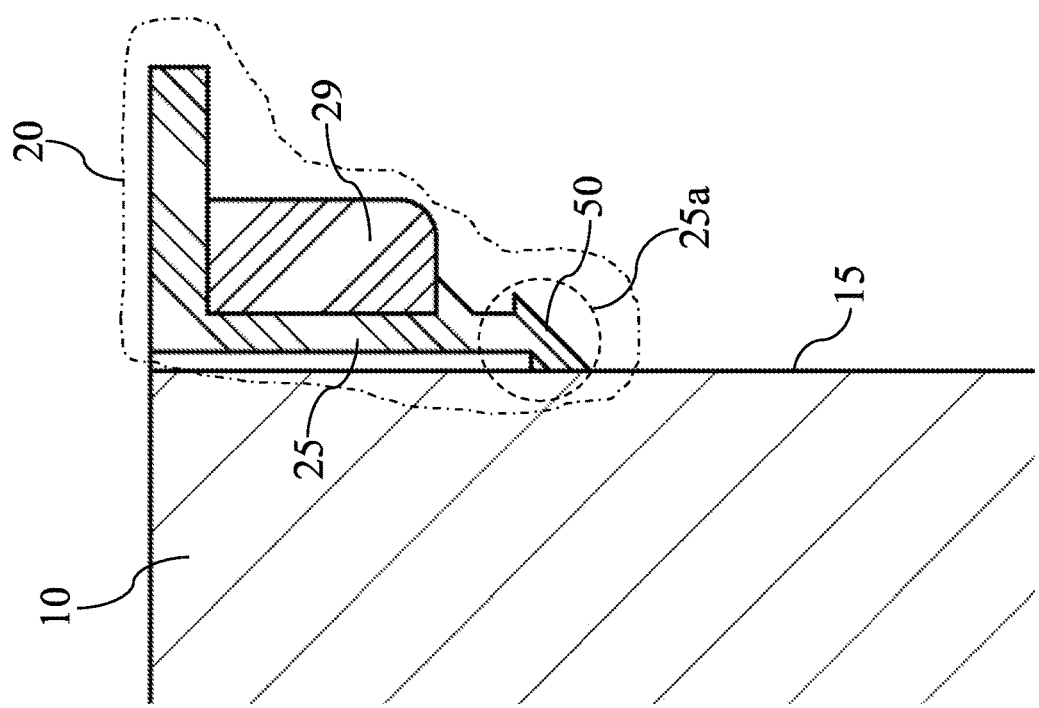
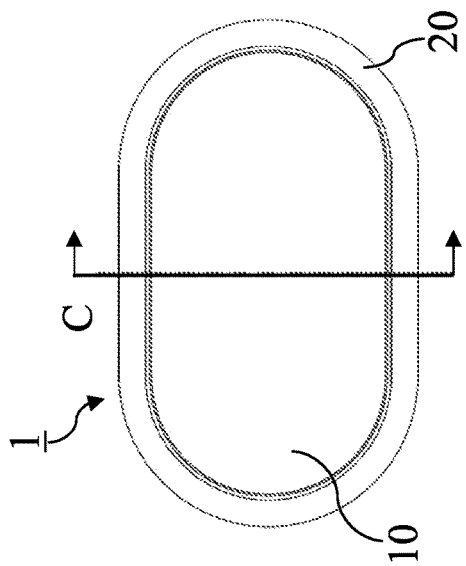
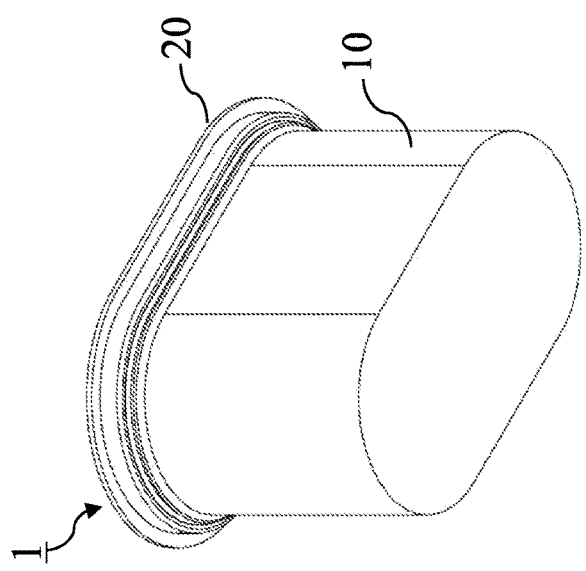
Fig. 5c
Fig. 5b
Fig. 5a

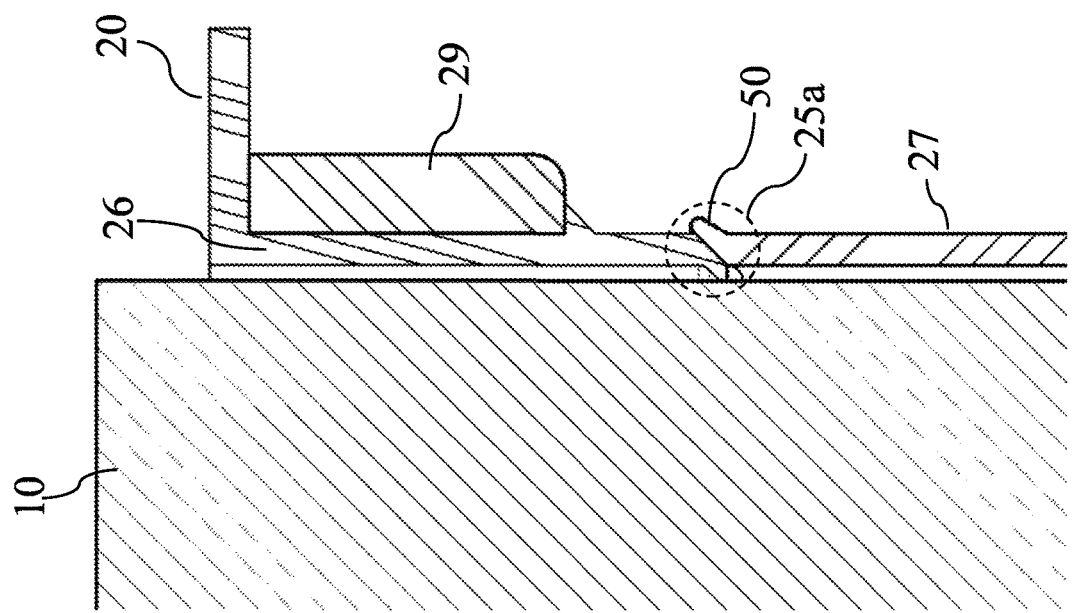
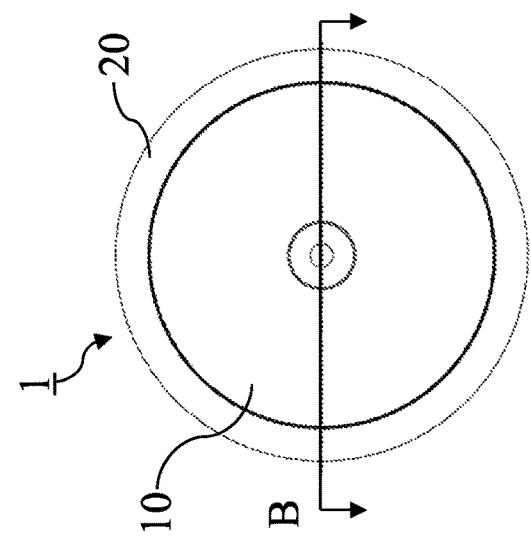
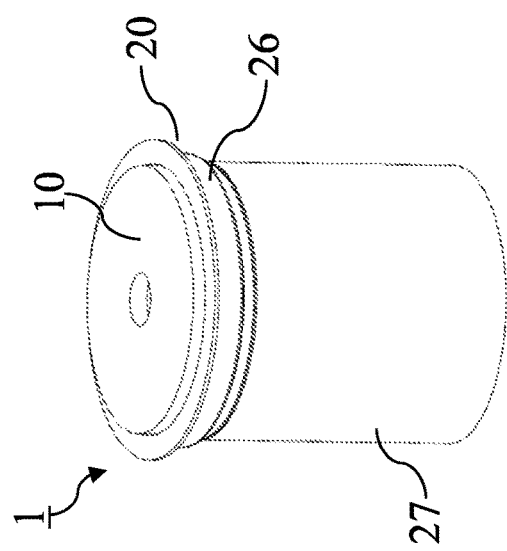
Fig. 10c
Fig. 10b
Fig. 10a

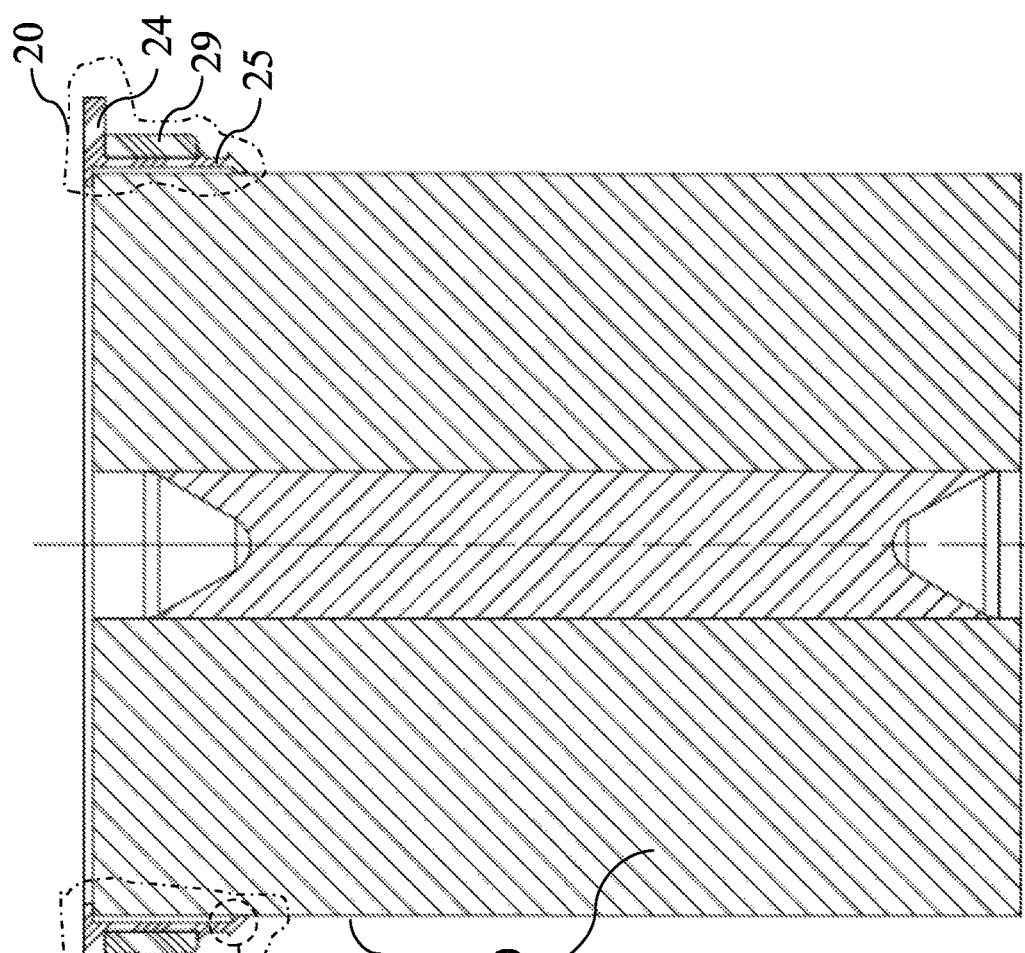
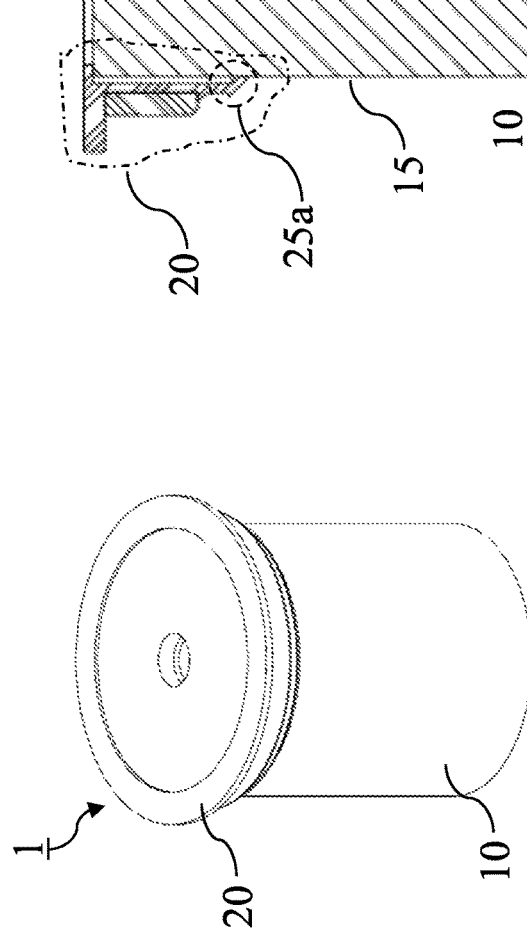
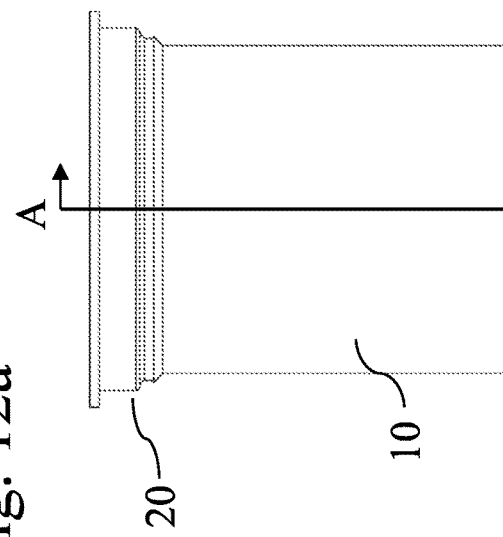

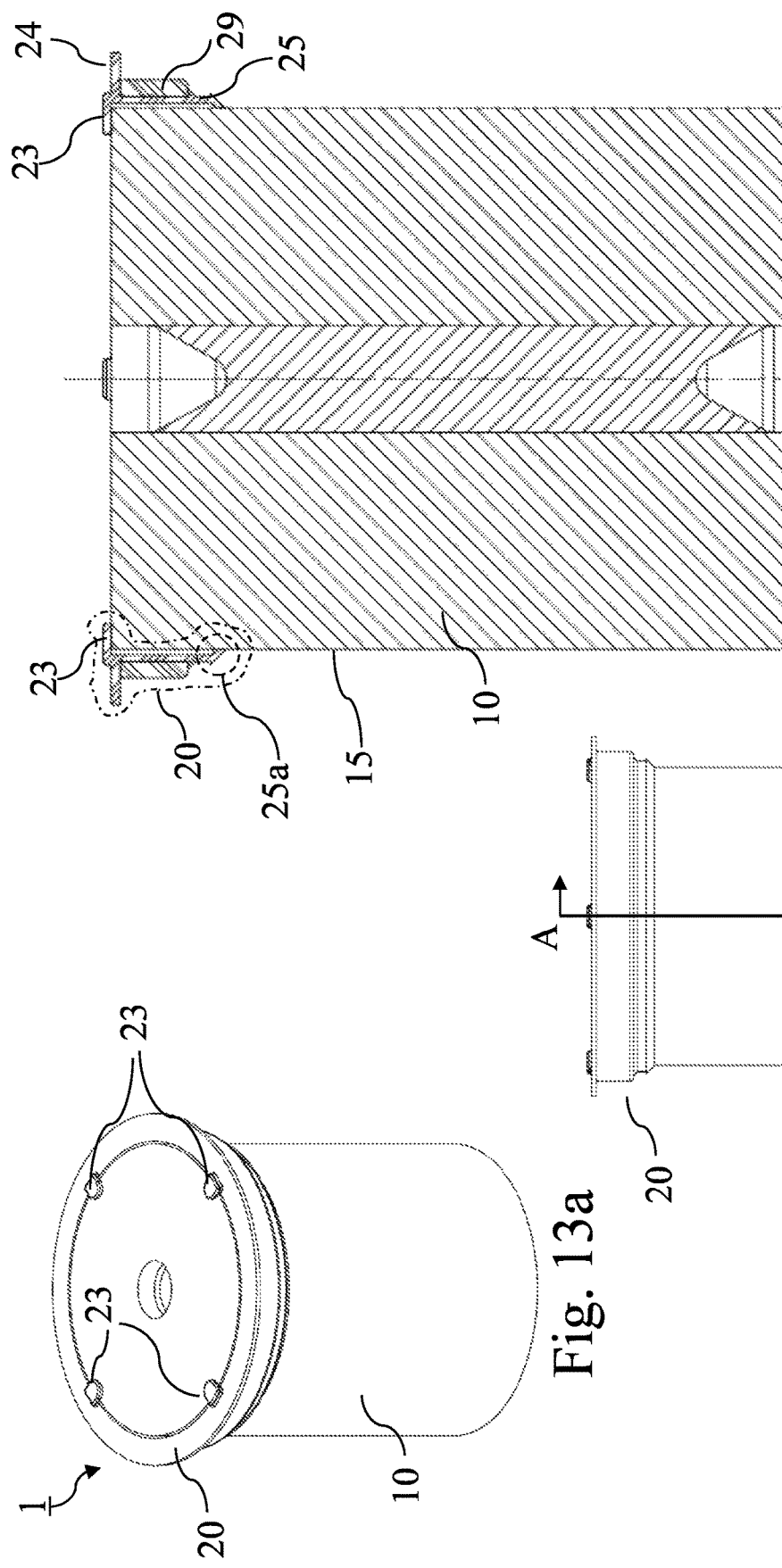

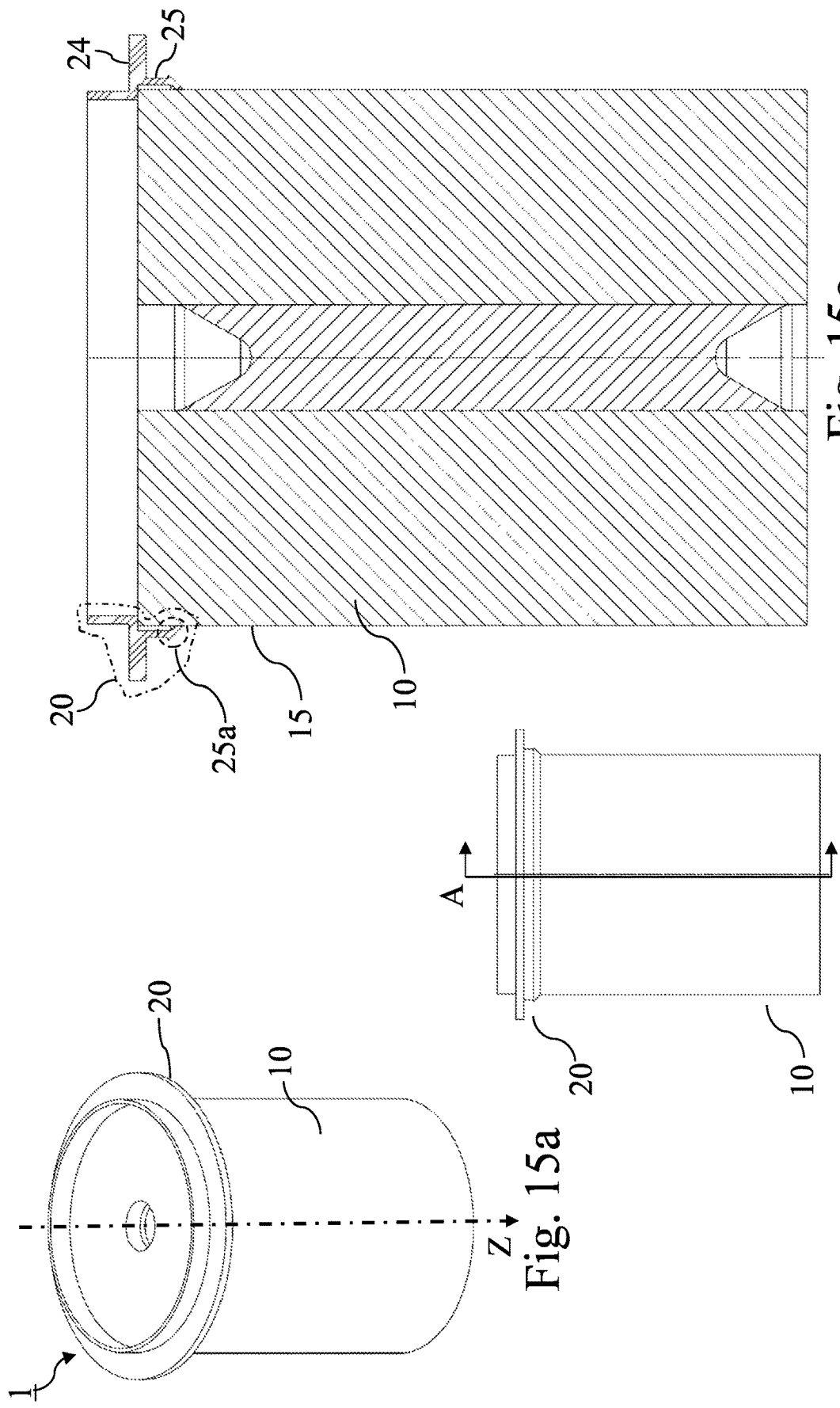

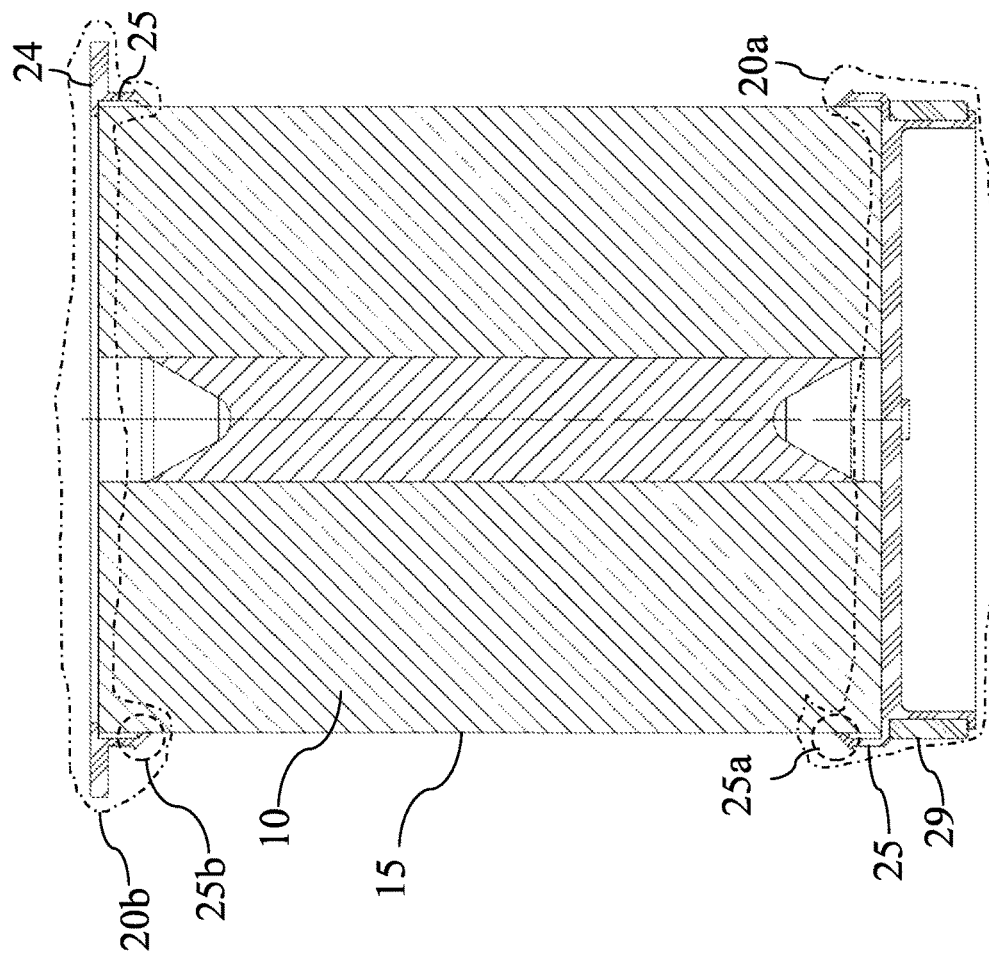
Fig. 16c
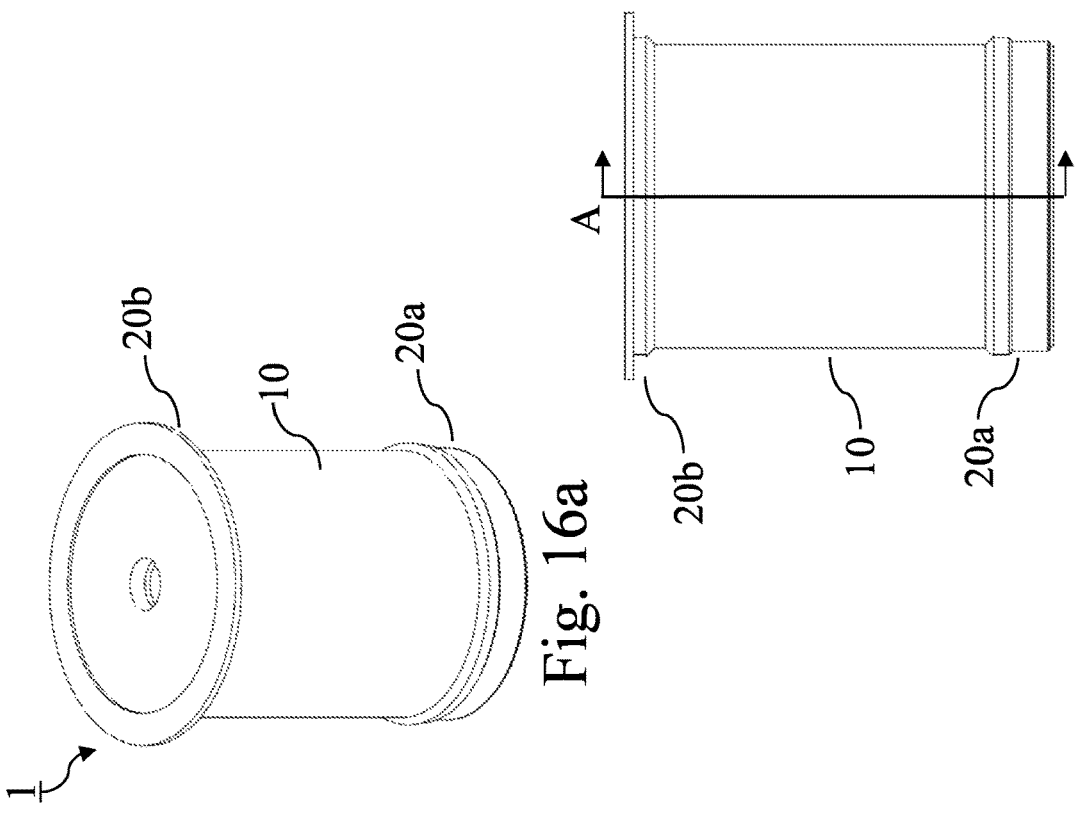
Fig. 16b
Fig. 16a

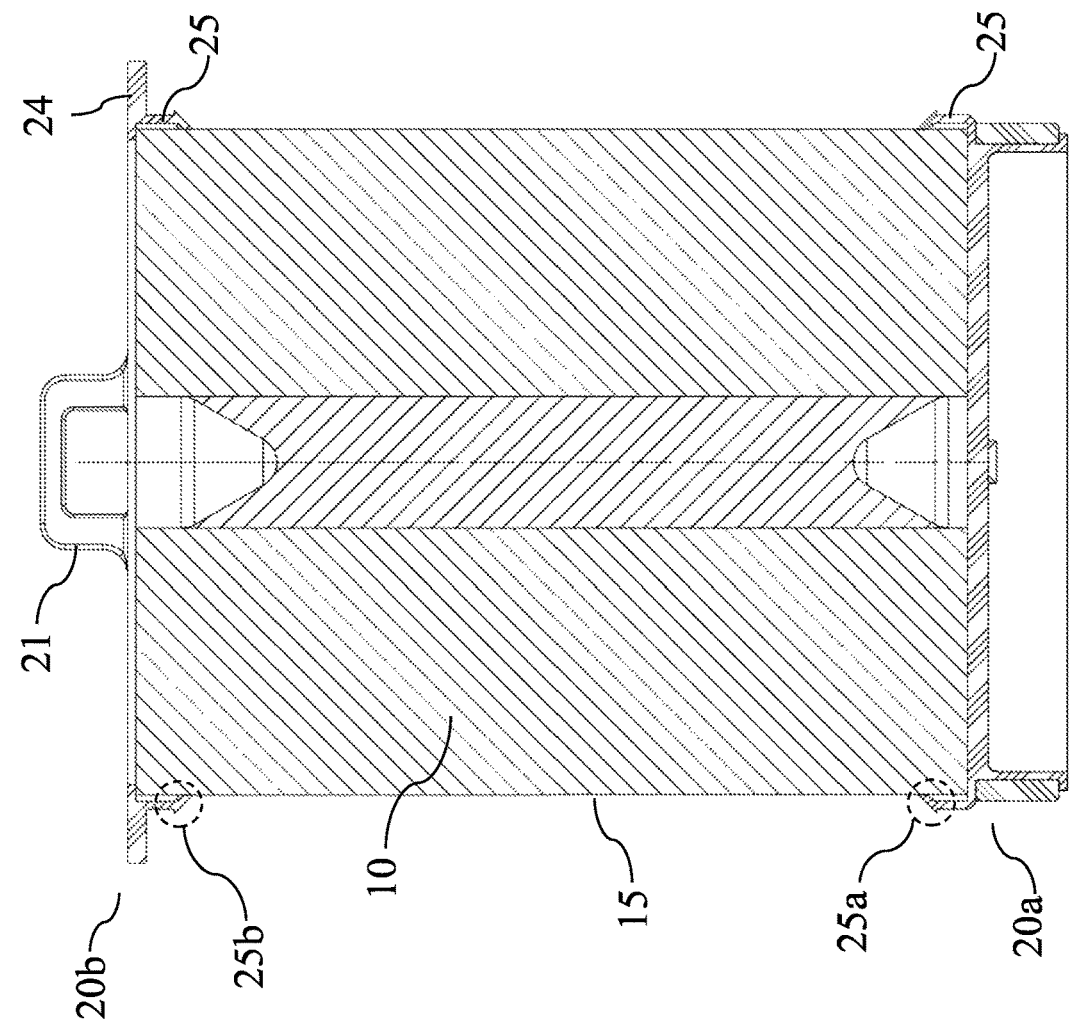
Fig. 17c
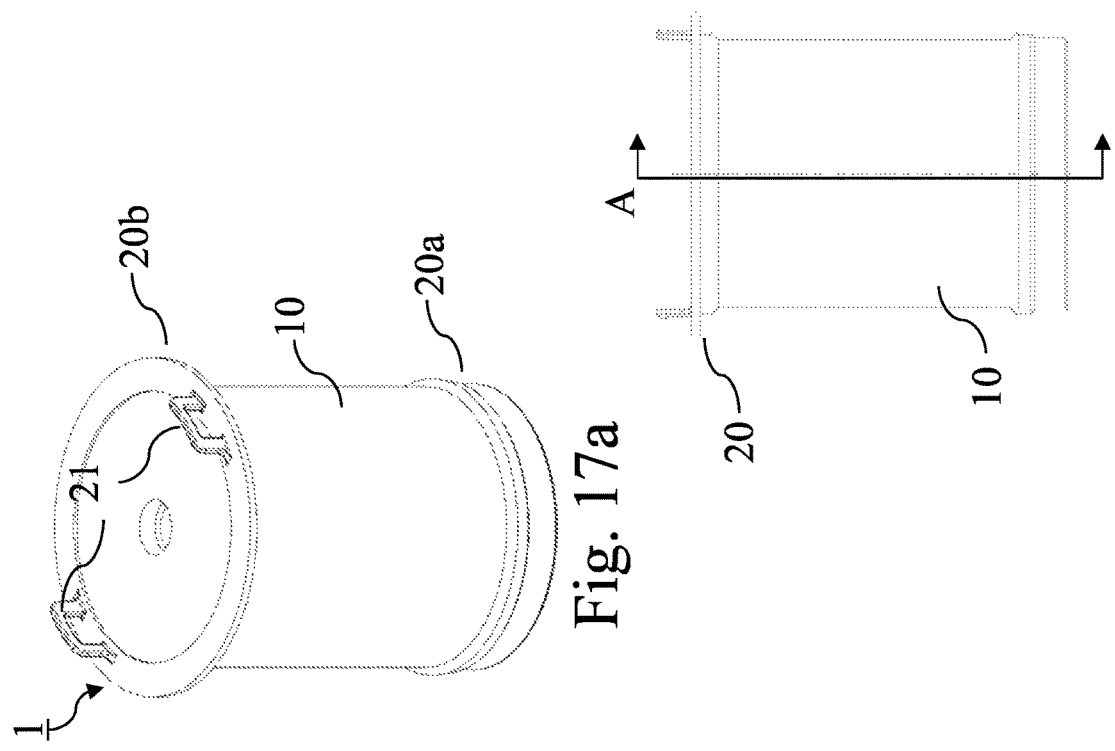
Fig. 17b
Fig. 17a

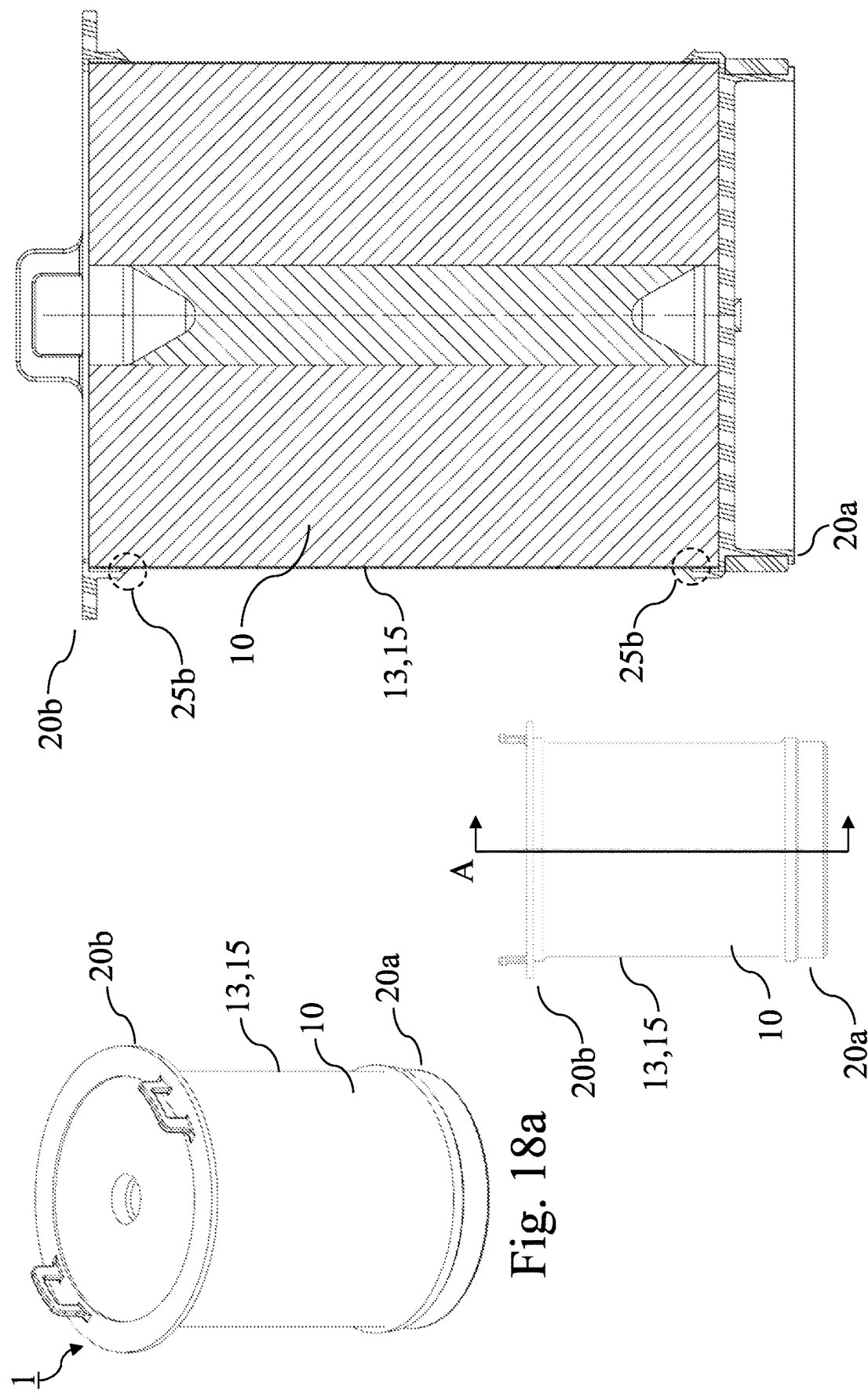

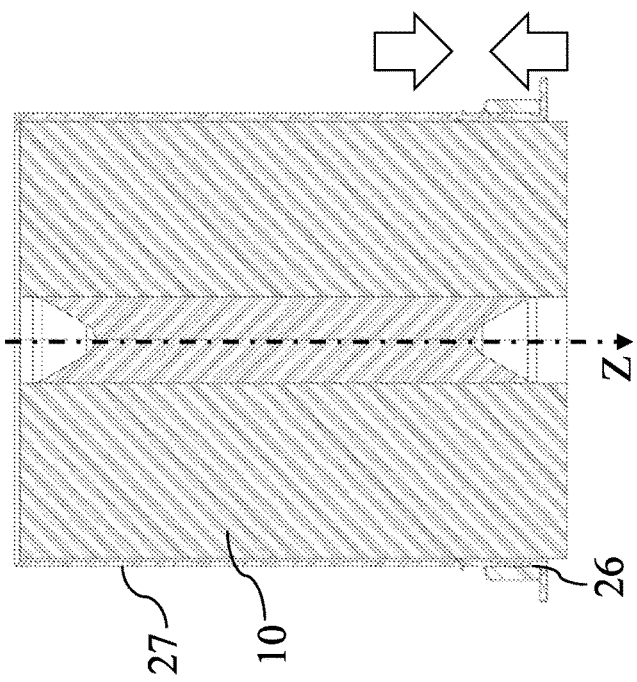
Fig. 21c
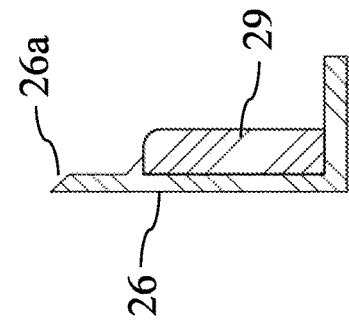
Fig. 21d
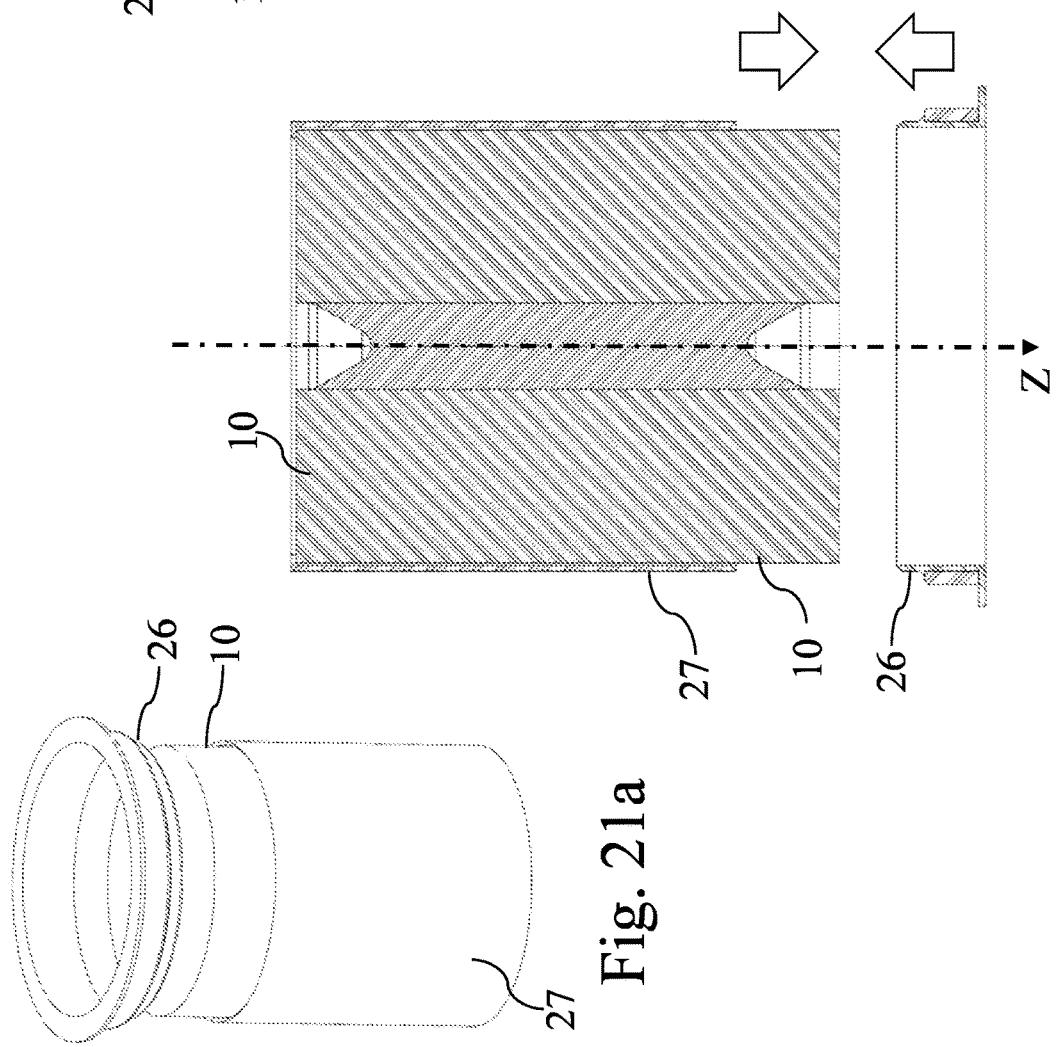
Fig. 21a
Fig. 21b

FILTER ELEMENT AND METHOD OF MANUFACTURING A FILTER ELEMENT

This application is a National Stage Application of PCT/US2022/014106 filed Jan. 27, 2022, which claims the benefit of and priority to European application serial number EP 21153828.5, filed Jan. 27, 2021, the entireties of which are incorporated herein by reference. To the extent appropriate, a claim of priority is made to each of the above-disclosed applications.

FIELD OF THE DISCLOSURE

The present disclosure relates to a filter element and a method for manufacturing a filter element, more precisely a filter element comprising a filter medium pack and a support arrangement attached to the filter medium pack. The present disclosure relates to filter elements wherein the filter medium pack comprises a circumferential face extending in a longitudinal direction from a fluid inlet flow face to an opposing fluid outlet face.

BACKGROUND

Filter elements for filtering a fluid, also referred to as filter cartridges, are used for a wide variety of filtering applications. The fluid can be a liquid or a gas including, for example, air.

The filter element is generally an element that is to be removed and replaced from a housing of the filter system at regular time intervals or when the filtering performance has dropped below a critical threshold level.

The filter element includes a filter medium pack including filter media for removing contaminant materials when the fluid flows through the filter media. Commonly used and commercially available filter media are for example pleated media or fluted media. The fluted media are also referred to as Z-filter media.

Typically, for so-called straight-through flow filter arrangements, the filter medium pack is delimited by a circumferential face extending in a longitudinal direction, a fluid inlet flow face and an opposing fluid outlet flow face.

As the filter medium pack is to be inserted in a housing of a filter system, additional elements, generally support arrangements are attached to the filter medium pack to form a filter element that is insertable in a housing of a filter system.

The support arrangement can for example be a seal arrangement including a seal member for sealing to the housing of the filter system. Indeed, for proper operation of a filter element, it is essential that the filter medium pack is properly sealed to the housing wherein the filter medium pack is inserted.

Various manufacturing methods have been proposed to manufacture a filter element comprising a filter medium pack and a support arrangement, e.g., a seal arrangement, attached to the filter medium pack.

In U.S. Pat. No. 7,396,376 a filter element comprising a fluted filter medium pack and a foamed polyurethane (PU) seal arrangement is disclosed. During the manufacturing process, the filter medium pack is placed in a mold together with a reinforcing frame element. Thereafter the mold is filled with PU and, following a rising process, a so-called overmold of foamed PU is formed. The reinforcing frame element provides strength to the seal member and also compensates for the irregular shape of the filter medium pack.

In U.S. Pat. No. 7,674,308, filter elements comprising fluted filter media are proposed wherein the filter medium pack is enclosed by a plastic shell. In these filter element configurations, the filter medium pack is secured to the shell with an adhesive and a PU seal member is positioned to completely circumscribe the plastic shell.

However, a disadvantage of PU seal arrangements is that they are less suited for environments where the temperature can become high, e.g., temperatures above about 80° C. Further, due to the foamed PU manufacturing process, the filter elements do not always have an aesthetic appearance.

Further, for seal arrangements in the form of end-caps that are coupled to the inlet or outlet face of the filter medium pack, can partly block the fluid flow.

Hence, there is room for improving a manufacturing process for filter elements resulting in robust and cost-effective filter elements, especially for filter elements wherein the filter media pack comprises opposite fluid inlet and outlet flow faces.

SUMMARY

It is an object of the present disclosure to provide a filter element for filtering fluids that is robust and cost-effective, more specifically a filter element wherein the filter medium pack comprises opposite fluid inlet and outlet flow faces. It is a further object of the present disclosure to provide a method for manufacturing such a filter element in a cost-effective way.

The present disclosure is defined in the appended independent claims. The dependent claims define advantageous embodiments.

According to a first aspect of the present disclosure, a filter element comprising a filter medium pack and a support arrangement is provided. The filter medium pack comprises a circumferential face extending in a longitudinal direction from a fluid inlet flow face to an opposing fluid outlet flow face, and the support arrangement comprises a shell member extending in the longitudinal direction and wherein the shell member is circumscribing at least a part of the circumferential face of the filter medium pack. The filter element according to the present disclosure is characterized in that at least a portion of the shell member is thermally welded to the circumferential face of the filter medium pack.

By using thermal welding for attaching the shell member of the support arrangement directly to the circumferential side of the filter medium pack, no glue or other adhesive is required and a robust filter element is obtained.

In embodiments, the filter medium pack comprises coiled layers of filter material.

In embodiments, the filter medium pack comprises coiled layers of filter material and wherein the circumferential face of the filter medium pack is an outer surface of an outer layer of the coiled layers of filter material. In other words, a portion of the shell member is directly thermally welded to the material of the filter medium pack. Typically, the filter material comprises cellulose fibers, synthetic fibers or a combination of both.

In embodiments, the circumferential face of the filter medium pack is formed by a plastic wrap wrapped around filter material of the filter medium pack.

In embodiments, the filter medium pack comprises coiled layers of filter material and an outer layer of the coiled layers is covered by a plastic wrap, and wherein an outer surface of the plastic wrap is forming the circumferential face of the filter medium pack.

In embodiments the filter medium pack comprises coiled layers of filter material and an outer layer of the coiled layers is at least partly covered by a plastic wrap. Hence, in these embodiments, at least a portion of the circumferential face of the filter medium pack comprises the plastic wrap. In these embodiments, the thermally welded portion of the shell member is thermally welded to the portion of the circumferential face of the filter medium pack that is comprising the plastic wrap.

In embodiments, the circumferential face of the filter medium pack is at least partly formed by a plastic wrap and the thermally welded portion of the shell member is thermally welded to the plastic wrap.

In embodiments, the thermally welded portion of the shell member is a circumferential portion forming a circumferential leak-tight joint between the shell member and the circumferential face of the filter medium pack.

In embodiments, a contour of the leak-tight joint has a circular shape, in other embodiments, a contour of the leak-tight joint has a non-circular shape.

In embodiments a contour of the leak-tight joint has a circular shape and the circumferential leak-tight joint is spaced from the fluid inlet flow face and spaced from the fluid outlet flow face with $S_{IN}>0.05\times H$ and $S_{OUT}>0.05\times H$, preferably $S_{IN}>0.10\times H$ and $S_{OUT}>0.10\times H$, and wherein $S_{IN}$ and $S_{OUT}$ is a separation distance measured along the longitudinal direction between the leak-tight joint and respectively the inlet and outlet flow face, and wherein H is a filter medium pack height measured along the longitudinal direction between the inlet flow face and the outlet flow face.

In embodiments, the shell member or at least the portion of the shell member thermally welded to the circumferential face of the filter medium pack is made of a thermoplastic material. Preferably, the thermoplastic material is any of the following materials or mixtures and combinations thereof: acrylonitrile butadiene styrene, polypropylene, polyamide, polyethylene terephthalate, polylactic acid, polyethylene, polycarbonate, polystyrene, or polyvinyl chloride.

In embodiments, the shell member or at least the portion of the shell member thermally welded to the circumferential face of the filter medium pack is made of a thermoplastic material wherein a structurally stronger material is added, e.g., glass fiber. This can facilitate the thermal welding of the shell member to the filter medium pack.

In embodiments, the thermoplastic material of the shell member further comprises a glass fiber or a mineral or a combination thereof.

In embodiments, the support arrangement is for example a seal arrangement. In these embodiments, the shell member or at least a part of the shell member is forming a seal carrier for supporting a seal member for sealing the filter element to a housing of a filter system. The seal carrier is to be construed as a seal frame for supporting the seal member.

In embodiments wherein the support arrangement is a seal arrangement, by providing a circumferential leak-tight joint between the shell member and the circumferential face of the filter medium pack, no additional seal member is required downstream of the leak-tight joint. Downstream is hereby defined with respect to a flow direction from the fluid inlet flow face to the fluid outlet flow face. Hence, in embodiments according to the present disclosure, the filter element does not comprise a seal member downstream of the leak-tight joint.

In embodiments wherein the support arrangement is a seal arrangement comprising a seal member, the leak-tight joint is configured for sealingly acting in parallel with the seal member of the seal arrangement such that, when in operation, filtered fluid is not mixed with unfiltered fluid.

In embodiments, the support arrangement is a moulded single-structure seal arrangement comprising the shell member and further comprising a seal member for sealing the filter element to a housing of a filter system. In these embodiments, the shell member can be construed as a seal carrier for the seal member.

In embodiments the seal member comprises a first material and the shell member or at least the portion of the shell member welded to the circumferential face of the filter medium pack comprises a second material, and wherein the second material is different from the first material. Preferably, in these embodiments, a glass transition temperature of the first material is greater than a glass transition temperature of the second material.

The moulded single-structure seal arrangement is for example obtained with a two-component injection moulding, or more generally a multi-component injection moulding, manufacturing process. Advantageously, by combining a multi-component injection moulding manufacturing process with a thermal welding manufacturing process, a robust filter element is obtained in a cost-effective way. Indeed by first coupling the seal and the seal carrier with the two-component injection moulding manufacturing process and further coupling the seal carrier to the filter medium pack with a thermal welding manufacturing process, a single-structure seal arrangement is obtained that is directly coupled to the filter medium pack without any use of an adhesive.

In embodiments, the seal member is made of or at least partly made of any of the following list of materials or a mixture or combination thereof: a rubber, a thermoplastic elastomer, a thermoset elastomer, a thermoplastic vulcanizate.

In embodiments, the seal member is made of or at least partly made of any of the following list of thermoplastic elastomers or a mixture or combination thereof: a polyamide thermoplastic elastomer, a copolyester thermoplastic elastomer, an olefinic thermoplastic elastomer, a styrenic thermoplastic elastomer, a urethane thermoplastic elastomer, or a dynamically vulcanized thermoplastic elastomer.

As a result of the thermal welding, an outer surface of the shell member that is thermally welded to the circumferential face of the filter medium pack comprises an imprint or indentation. The imprint or indentation visually reflects the location where the thermal welding has been performed. Hence, the imprints or indentations on the shell member have to be construed as welding imprints or welding indentations.

In embodiments, an outer surface of the shell member that is thermally welded to the circumferential face of the filter medium pack comprises a circumferential imprint.

In embodiments, an outer surface of the shell member comprises a circumferential imprint having a circumferential chamfered shape. In other embodiments, an outer surface of the shell member comprises a circumferential imprint that is V shaped or double V shaped.

In embodiments, an outer surface of the shell member that is thermally welded to the circumferential face of the filter medium pack comprises one or more individual indentations. The indentation can for example be a notch, an incision, a recess, a split-line or a partial split-line.

In further embodiments, an outer surface of the shell member comprises both a circumferential imprint and one or more individual indentations.

According to a second aspect of the disclosure, a method of manufacturing a filter element comprising a filter medium pack having a circumferential face extending in a longitudinal direction from a fluid inlet flow face to an opposing fluid outlet flow face, is provided. The method comprises:
- providing a support arrangement comprising a shell member configured for circumscribing the circumferential face or at least a part of the circumferential face of the filter medium pack,
- heating at least a portion of the shell member,
- positioning the shell member around the circumferential face of the filter medium pack,
- pushing the heated portion of the shell member or at least part of the heated portion of the shell member against the circumferential face of the filter medium pack,
- allowing the circumferential portion of the shell member to cool down.

In embodiments according to the method of the present disclosure, the heated portion is a circumferential portion of the shell member such that when pushing the heated portion of the shell member against the circumferential face of the filter medium pack, a circumferential spacing between the shell member and the circumferential face of the filter medium pack becomes sealed off.

The heating of the portion of the shell member is performed either prior to positioning the shell member around the circumferential face of the filter medium pack, or alternatively, the heating of the portion of the shell member is performed after positioning the shell member around the circumferential face of the filter medium pack.

In embodiments wherein the heated portion of the shell member corresponds to a circumferential edge of the shell member, the pushing of the heated portion of the shell member or at least part of the heated portion of the shell member against the circumferential face of the filter medium pack comprises:
- providing a jig element comprising a circumferential chamfered edge configured for encircling the circumferential face of the filter medium pack,
- positioning the jig element with respect to the filter medium pack such that the that the circumferential chamfered edge of the jig element is encircling the circumferential face of the filter medium pack and is facing in the longitudinal direction towards the circumferential edge of the shell member,
- relatively moving the shell member with respect to the jig element along the longitudinal direction until the chamfered edge of the jig element pushes against the heated circumferential edge of the shell member and at least a portion of the heated circumferential edge is guided towards the circumferential face of the filter medium pack and thereby fills up the circumferential spacing between the shell member and the circumferential face of the filter medium pack.

In further embodiments, the pushing of the heated portion or at least part of the heated portion of the shell member against the circumferential face of the filter medium pack comprises:
- positioning a plurality of plates around the shell member such that the plates are transverse with respect to said longitudinal axis,
- moving the plurality of plates such that edge portions of the plates are pushing against the heated circumferential portion of the shell member.

SHORT DESCRIPTION OF THE DRAWINGS

These and further aspects of the present disclosure will be explained in greater detail by way of example and with reference to the accompanying drawings in which:

FIG. 1a schematically illustrates an isometric view of an embodiment of a filter medium pack having opposite inlet and outlet flow faces;

FIG. 1b schematically illustrates an isometric view of an embodiment of a filter medium pack having an obround shape;

FIG. 2 schematically illustrates a cross-section of a layer of fluted filter media;

FIG. 3a to FIG. 3g schematically illustrate cross-sectional views of examples of filter elements according to the present disclosure;

FIG. 4a to FIG. 4c illustrate respectively an isometric view, a side view and a portion of a projection on a cross-plane of a filter element according to the present disclosure wherein the filter medium pack has a cylindrical shape;

FIG. 5a to FIG. 5c illustrate respectively an isometric view, a top view and a portion of a projection on a cross-plane of a filter element according to the present disclosure wherein the filter medium pack has an obround shape;

FIG. 10a to FIG. 10c illustrate respectively an isometric view, a top view and a portion of a projection on a cross-plane of a filter element according to the present disclosure wherein a first part of a shell member is welded to a second part of a shell member;

FIG. 12a to FIG. 12c illustrate respectively an isometric view, a side view and a portion of a projection on a cross-plane of a filter element according to the present disclosure wherein the support arrangement of the filter element comprises a flange covering an edge portion of a flow face of the filter medium pack;

FIG. 13a to FIG. 13c illustrate respectively an isometric view, a side view and a portion of a projection on a cross-plane of a filter element according to the present disclosure wherein the support arrangement of the filter element comprises a flange member and four notches coupled with an edge portion of a flow face of the filter medium pack;

FIG. 15a to FIG. 15c illustrate respectively an isometric view, a side view and a portion of a projection on a cross-plane of a filter element according to the present disclosure wherein the support arrangement of the filter element comprises a flange with a collar member extending in the longitudinal direction;

FIG. 16a to FIG. 16c illustrate respectively an isometric view, a side view and a portion of a projection on a cross-plane of a filter element according to the present disclosure wherein the filter element comprises a first and a second support arrangement welded to respectively a first end and a second end of the filter medium pack;

Figure 23B:
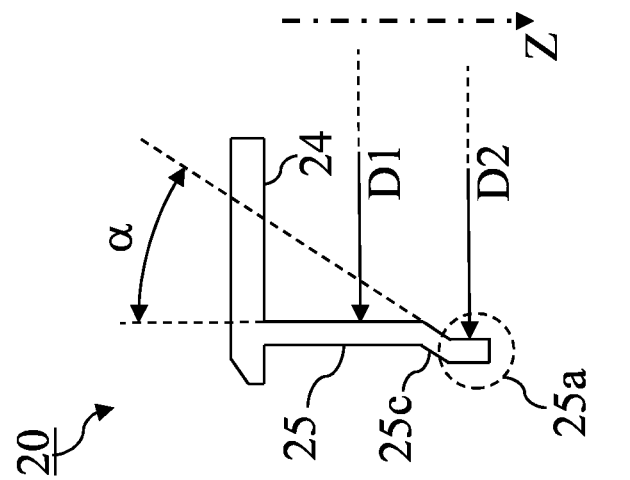
Figure 23A:
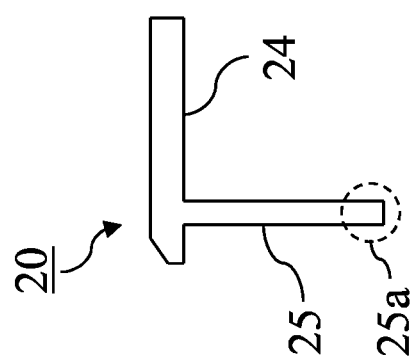
Figure 22:
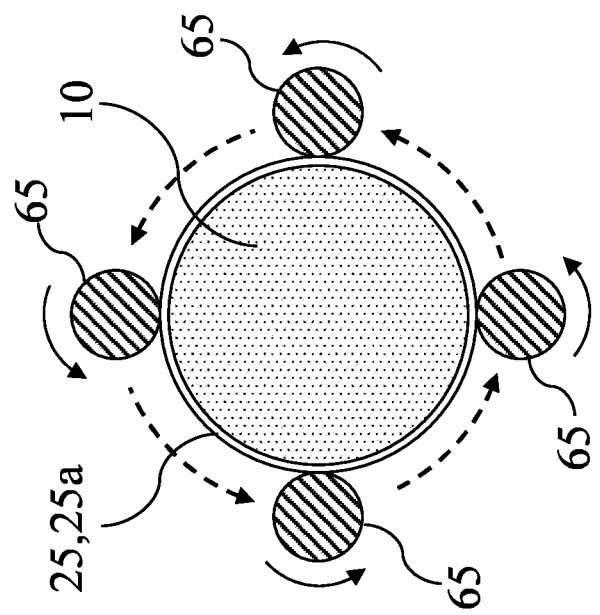

FIG. 17a to FIG. 17c illustrate respectively an isometric view, a side view and a portion of a projection on a cross-plane of a filter element according to the present disclosure wherein the filter element comprises a first and a second support arrangement welded to respectively a first end and a second end of the filter medium pack and wherein the first support arrangement comprises a seal member and the second support arrangement comprises handles;

FIG. 18a to FIG. 18c illustrate respectively an isometric view, a side view and a portion of a projection on a cross-plane of a filter element according to the present disclosure wherein the filter medium pack comprises a plastic wrap;

FIG. 19a to FIG. 19f schematically illustrate an exemplary embodiment of the manufacturing method according to the present disclosure;

FIG. 20a to FIG. 20e illustrate a filter element manufacturing method according to the present disclosure wherein sliding plates are used during the thermal welding process;

FIG. 21a to FIG. 21d illustrate a filter element manufacturing method wherein a first part of a shell member is welded to a second part of the shell member;

FIG. 22 schematically illustrates a portion of a welding process according to the present disclosure wherein four rollers are configured to rotate around the filter medium pack; and FIG. 23a and FIG. 23b illustrate cross-sectional views of embodiments of a support arrangement comprising a shell member and a flange member forming an end cap for the filter medium pack.

The drawings of the figures are neither drawn to scale nor proportioned. Generally, identical components are denoted by the same reference numerals in the figures.

DETAILED DESCRIPTION

The present disclosure will be described in terms of specific embodiments, which are illustrative of the disclosure and not to be construed as limiting. It will be appreciated by persons skilled in the art that the present disclosure is not limited by what has been particularly shown and/or described and that alternatives or modified embodiments could be developed in the light of the overall teaching of this disclosure. The drawings described are only schematic and are non-limiting.

Use of the verb "to comprise", as well as the respective conjugations, does not exclude the presence of elements other than those stated. Use of the article "a", "an" or "the" preceding an element does not exclude the presence of a plurality of such elements.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Reference throughout this specification to "one embodiment" or "an embodiment" means that a particular feature, structure or characteristic described in connection with the embodiments is included in one or more embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one ordinary skill in the art from this disclosure, in one or more embodiments.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

Filter Medium Packs

With reference to FIG. 1a and FIG. 1b, examples of embodiments of a filter medium pack 10 suitable for forming a filter element according to the present disclosure are shown. As illustrated, the filter medium pack 10 is delimited by a circumferential face 15 extending in a longitudinal direction Z, a fluid inlet flow face 11 and an opposing fluid outlet flow face 12. Generally, the fluid inlet and outlet flow faces are transverse to the longitudinal direction Z.

The filter medium packs 10 may be made in a variety of geometrical shapes and the present disclosure is not limited to any specific filter medium pack geometrical shape. For example, the filter medium pack can have a cylindrical shape as illustrated on FIG. 1a, wherein a cross-section of the circumferential face 15 with a plane transverse to the longitudinal direction is round. In other embodiments, the cross-section of the circumferential face 15 with a plane transverse to the longitudinal direction is obround or has a racetrack shape as illustrated on FIG. 1b, while in further embodiments the cross-sectional shape is a square or a rectangular shape with rounded corners. In some embodiments, the filter medium pack can have a conical shape.

The arrows on FIG. 1a, illustrate an inlet and outlet fluid flow direction for the fluid. Such a filter medium pack arrangement as shown on FIG. 1a and FIG. 1b is also named straight-through flow arrangement. As fluid crosses the filter medium pack in a flow direction from the inlet flow face at a first end of the filter medium pack to the outlet flow face at an opposite end of the filter media pack, the filter media conducts filtration of the fluid.

In general, the filter media is a relatively flexible material, typically a non-woven fibrous material, e.g., cellulose fibers, synthetic fibers or a combination of both, often including a resin therein and sometimes treated with additional materials.

In some embodiments, the filter medium may include a wet laid media. In some embodiments the filter medium may include a dry formed or dry laid media. The filter medium may include any suitable combination of materials selected by the skilled artisan including, for example, polymers, fibers, binders, and additives.

In an exemplary embodiment, the filter medium may include a wet laid non-woven filter medium including primarily cellulose fibers.

In another exemplary embodiments, the filter medium may include a wet laid non-woven filter medium including cellulose fibers and synthetic fibers, wherein the filter medium includes up to 10% or up to 20% synthetic fibers.

In yet another exemplary embodiment, the filter medium may include a dry laid media including spunbond synthetic fibers. Exemplary spunbond synthetic fibers include polyester fibers.

In a further exemplary embodiment, the filter medium may include a multi-layer dry laid media including synthetic fibers. Each of these medias may, as noted above, include additional binders and/or additives. Additive compounds may add functionality, including but not limited to flame retardancy, oleophobicity, and/or hydrophobicity.

In preferred embodiments, the filter medium pack comprises fluted filter media also known as Z-filter media. An example of commercially available Z-filer media is known under the name Powercore™ as manufactured by Donaldson Company Inc.

In embodiments, the filter media may be formed by coiled layers of filter material.

In embodiments, by coiling layers of filter material, a filter medium pack is obtained wherein the outer circumferential face 15 of the filter medium pack is formed by a surface of an outer layer of the coiled filter media.

In embodiments the filter media may be formed by coiled layers of fluted filter material wherein each of these coiled layers includes inlet flutes and outlet flutes oriented essentially parallel with the longitudinal direction Z. By coiling layers of fluted filter material, a filter medium pack is formed wherein the outer circumferential face 15 of the filter medium pack is formed by a surface of an outer layer of the coiled fluted filter media.

In further embodiments comprising coiled layers of filter material, an outer layer of the coiled filter material is at least partly covered with a plastic wrap. The plastic wrap is to be construed as a protecting cover. In this way, at least a portion of the circumferential face of the filter medium pack is formed by the plastic wrap. The plastic wrap can for example be glued to the outer layer of the filter material or the plastic wrap can be an adhesive tape. In embodiments, as further discussed below, the plastic wrap can also be thermally welded to the outer layer of the coiled layers of filter material.

In embodiments comprising coiled layers of fluted filter material, each of the layers of coiled fluted material include a set of inlet flutes and a set of outlet flutes. The set of inlet flutes are open at the axial inlet side of the filter body in order to receive the unfiltered fluid and the inlet flutes are closed at the axial outlet side of the filter body. On the other hand, the set of outlet flutes are closed at the axial inlet side and open at the axial outlet side to allow the filtered fluid to exit the filter body. In this way, the fluid is forced to make a Z-shaped trajectory to flow from the axial inlet side to the axial outlet side.

Exemplary fluted filter media and filter medium packs including fluted filter media including coiled Z-filter media are disclosed in U.S. Pat. Nos. 6,350,291 and 7,396,376 and European Patent Publication No. 3680002.

As schematically illustrated on FIG. 2, one construction type of Z-filter coiled media uses two sheets for forming a layer 5 of filter media, a first sheet 5a is corrugated and is secured to a second 5b non-corrugated sheet, also named facing sheet. When using this type of media in a rolled construction, it typically will be wound around itself. In embodiments wherein the coiled layers are layers formed by securing a corrugated sheet with a non-corrugated sheet, the outer circumferential face 15 of the filter medium pack is an outer surface of the non-corrugated sheet of the outer layer of the coiled layers of filter media.

As further described in U.S. Pat. Nos. 6,350,291 and 7,396,376, with respect to Z-filter media, "coiled" is meant to refer to a filter medium pack formed by coiling a strip of a fluted filter media to form the filter medium pack.

Filter Elements

With reference to FIG. 3a to FIG. 18c, various examples of embodiments of filter elements 1 according to the present disclosure are illustrated. FIG. 3a to FIG. 3g are cross-sections of filter elements 1 with a cross-plane comprising the longitudinal axis Z of the filter element 1. FIG. 4a to FIG. 18c show a combination of isometric views, side views, top views and projections on a cross-plane comprising the longitudinal axis Z of examples of filter elements according to the present disclosure.

As shown on these figures, the filter element 1 comprises besides the filter medium pack 10 a support arrangement 20 comprising a shell member 25 that is extending in the longitudinal direction and is circumscribing at least a part of the circumferential face 15 of the filter medium pack. These embodiments have in common that a portion 25a of the shell member is thermally welded to the circumferential face 15 of the filter medium pack such that the support arrangement 20 is attached to the filter medium pack. Hence, no adhesive or glue is required to attach the support arrangement 20 to the filter medium pack 10. On FIG. 3a to FIG. 11c, a dashed circle schematically indicates the location where at least a portion 25a of the shell member is thermally welded to the circumferential face 15 of the filter medium pack 10.

In embodiments, the thermally welded portion 25a of the shell member 25 is a circumferential portion. In other words, in these embodiments a circumferential welding seam is formed as a result of the thermal welding. In this way, by welding a circumferential portion of the shell member, a circumferential leak-tight joint is formed between the shell member 25 and the circumferential face 15 of the filter medium pack. For example, in embodiments wherein the support arrangement is a seal arrangement, the thermally welded portion 25a is a circumferential portion. In this way, a reliable radial and leak-tight attachment of the support arrangement 20 to the filter medium pack is obtained without use of any adhesive and without any blocking of the fluid flow from the fluid inlet flow face 11 to the fluid outlet flow face 12.

A circumferential leak-tight joint has to be construed as a sealing joint. In other words, when in operation, fluid can only flow from the inlet flow face to the outlet flow face by traversing the filter medium pack and no fluid can flow in between the shell member 25 and the circumferential face of the filter medium pack.

In embodiments wherein the support arrangement is a seal arrangement comprising a seal member 29, the leak-tight joint is configured for sealingly acting in parallel with the seal member of the seal arrangement such that, when in operation, filtered fluid is not mixed with unfiltered fluid.

In embodiments of filter elements according to the present disclosure wherein the support arrangement is a seal arrangement 20, the filter element does not comprise any additional seal member coupled to the circumferential face 15 of the filter medium pack for sealing against a housing of a filter system. In these filter element embodiments, the only seal member of the filter element for sealing against a housing of a filter system is the seal member of the seal arrangement 20. Seal arrangements 20 according to the present disclosures are further discussed below.

In embodiments of filter elements according to the present disclosure wherein the support arrangement is a seal arrangement 20, the filter element 1 does not comprise any additional seal member downstream of the circumferential leak-tight joint. Downstream is defined with respect to the flow direction from the inlet flow face to the outlet flow face.

In other embodiments, the thermally welded portion 25a of the shell member 25 is not necessarily a circumferential portion. Indeed, in some embodiments, the welding can only be performed at some discrete spots or locations on the shell member. For example, if the support arrangement is an anti-telescope member or a support structure for supporting handles, a leak-tight joint is not necessarily, and hence in these embodiments thermal welding at discrete spots for attaching the support arrangement to the filter medium pack can be sufficient.

With reference to FIGS. 4a to 4c, an isometric view, a side view and a portion of a projection on a cross-plane of an embodiment of a filter element according to the present disclosure is shown wherein the filter medium pack has a cylindrical shape. In FIG. 4c, a portion of a projection on the cross-plane A indicated on FIG. 4b, is shown and the dashed circle schematically indicates the location where a portion 25a of the shell member is welded to the circumferential face 15 of the filter medium pack. In this example the support arrangement 20 is a seal arrangement that besides the shell member 25 further comprises a seal member 29. On FIG. 4c, the support arrangement 20 is encircled with a dashed-dotted line.

With reference to FIGS. 5a to 5c, an isometric view, a top view and a portion of a projection on a cross-plane of a filter element according to the present disclosure is shown wherein the filter medium pack has an obround shape. In FIG. 5c, a portion of a projection on the cross-plane C indicated on FIG. 5b, is shown. On FIG. 5c, the support arrangement 20 is encircled with a dashed-dotted line. In this example, the support arrangement 20 is also a seal arrangement that besides the shell member 25 further comprises a seal member 29. The dashed circle schematically indicates where the circumferential portion 25a of the shell member is welded.

Figure 6C:
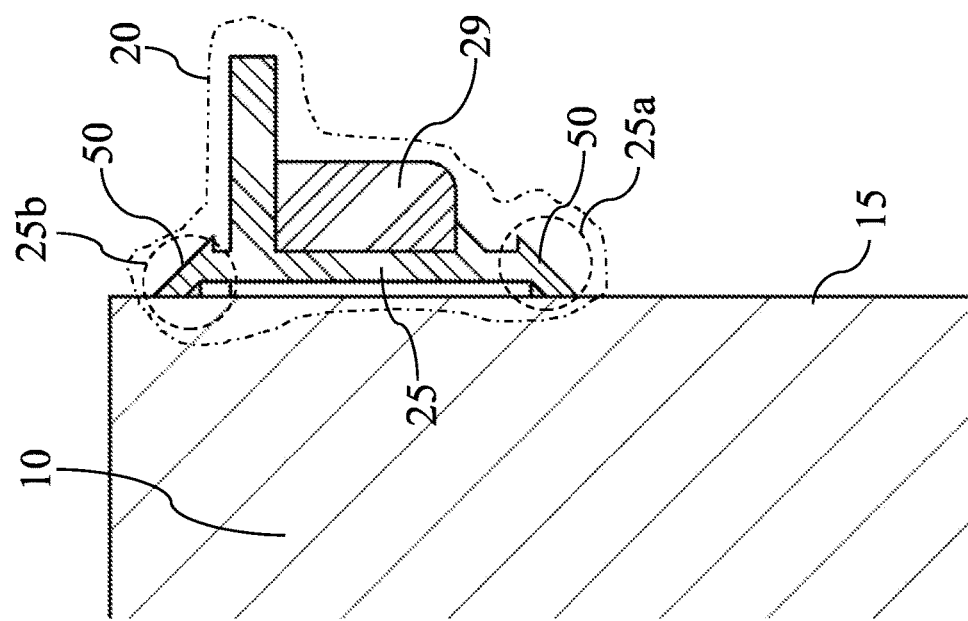
FIG. 6a to FIG. 6c illustrate respectively an isometric view, a top view and a portion of a projection on a cross-plane of a filter element according to the present disclosure wherein two circumferential portions of the shell element are welded to the filter medium pack.
Figure 6A:
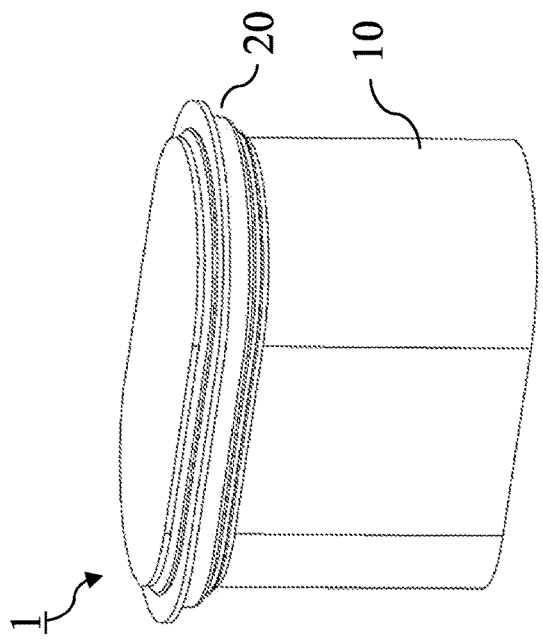
Figure 6B:
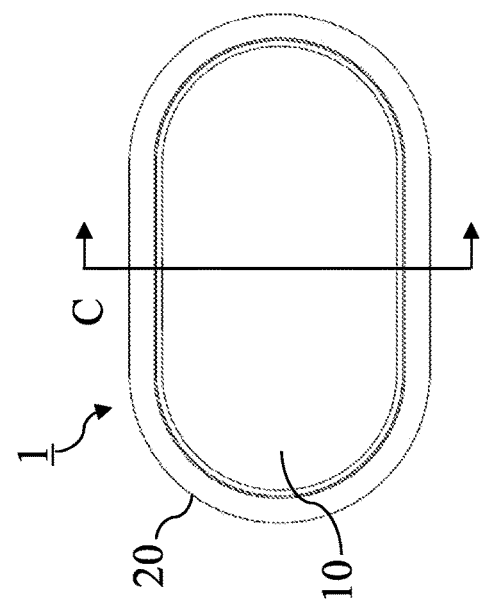

The welding of the shell member to the filter medium pack is not limited to welding a single circumferential portion 25a to the filter medium pack. In some embodiments, more than one circumferential portion of the shell member is welded to the filter medium pack. For example, as schematically illustrated on FIG. 3e to FIG. 3g, two circumferential portions 25a and 25b are welded to the circumferential face 15 of the filter medium pack. Welding more than one circumferential portion can make the filter element more robust. With reference to FIGS. 6a to 6c, an isometric view, a top view and a portion of a projection on a cross-plane C of a filter element is shown wherein two circumferential portions 25a and 25b of the shell element are welded to the filter medium pack. The location where the two circumferential portions 25a and 25b of the shell member 25 are welded to the circumferential face 15 of the filter medium pack are schematically indicated on FIG. 6c with two dashed circles. On FIG. 6c, the support arrangement 20 is encircled with a dashed-dotted line.

With reference to FIG. 3d and FIG. 3g, the shell member 25 is entirely surrounding the circumferential face 15 of the filter medium pack, i.e., the shell member is extending from the fluid inlet flow face 11 to the opposing fluid outlet flow face 12 and forms a protective cover for the filter medium pack. In other embodiments, as for example illustrated on FIG. 3a to FIG. 3c, the shell member 25 is only surrounding a part of the filter medium pack.

With reference to FIGS. 10a to 10c, an isometric view, a top view and a portion of a projection on a cross-plane B of a filter element is shown wherein a first part of a shell member 26 is welded to a second part of a shell member 27. The two shell parts 26 and 27 form the shell member 25. On FIG. 10c a projection on the cross-plane B indicated on FIG. 10b, is shown. The dashed circle on FIG. 10c schematically indicates not only where the first and second shell part are welded together but also where at the same time a portion 25a of the shell member is welded to the circumferential face 15 of the filter medium pack. The method of welding applied for this embodiment is further discussed below in more detail.

The precise location where the circumferential portion 25a of the shell member is welded to the circumferential face 15 of the filter medium pack 10 can vary from embodiment to embodiment. For example, as schematically illustrated on FIG. 3a, the welding is performed in the middle of the filter medium pack. In other embodiments, as illustrated on FIG. 3d, the welding is performed closer to the fluid inlet flow face or closer the fluid outlet flow face of the filter medium pack.

In embodiments, as schematically illustrated on FIG. 3a to FIG. 3b, wherein the circumferential welded portion is forming a circumferential leak-tight joint between the shell member 25 and the circumferential face 15 of the filter medium pack, the circumferential leak-tight joint is circular. In other words, a separation distance between the leak-tight joint and the inlet flow face measured along the longitudinal direction Z is the same independent of the point on the leak-tight joint the distance is measured from.

The reference $S_{IN}$ and/or $S_{OUT}$ shown on FIG. 3a to FIG. 3d correspond to a separation distance measured along the longitudinal direction Z between the leak-tight joint and respectively the inlet 11 and outlet 12 flow face. For example, if the welding is performed in the middle of the filter medium pack, as illustrated on FIG. 3a, then $S_{IN}=S_{OUT}$. The parameters $S_{IN}$ and/or $S_{OUT}$ allow to identify the location where the welding is performed with respect to the inlet and outlet flow faces, i.e., the parameters define the location of the welding seam.

In embodiments, the circumferential leak-tight joint is spaced from the fluid inlet flow face 11 and spaced from said fluid outlet flow face 12 with $S_{IN}>0.05\times H$ and $S_{OUT}>0.05\times H$, wherein H is a filter medium pack height measured along the longitudinal direction Z between the inlet flow face and the outlet flow face, as illustrated on FIG. 3a. In other embodiments, $S_{IN}>0.10\times H$ and $S_{OUT}>0.10\times H$.

Figure 7C:
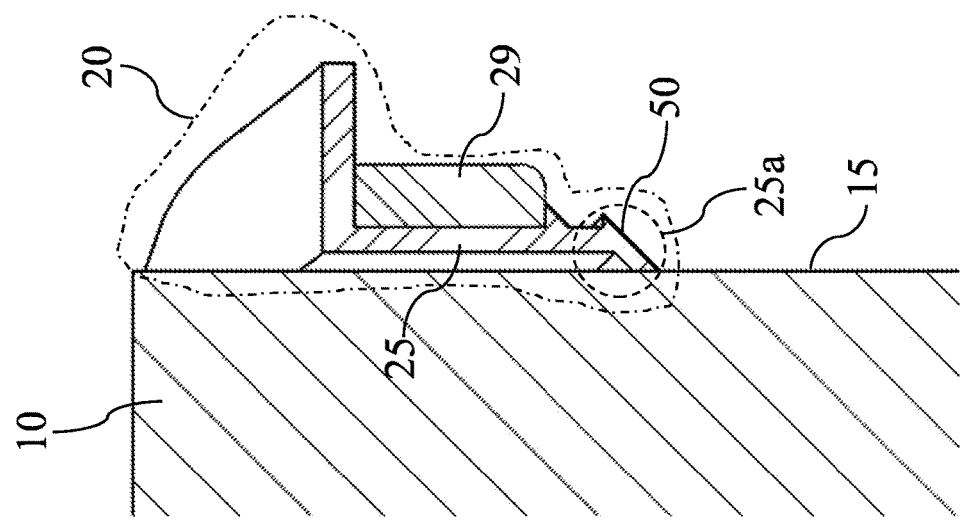
FIG. 7a to FIG. 7c illustrate respectively an isometric view, a side view and a portion of a projection on a cross-plane of a filter element according to the present disclosure wherein the shell member comprises a circumferential non-circular welding imprint.
Figure 7B:
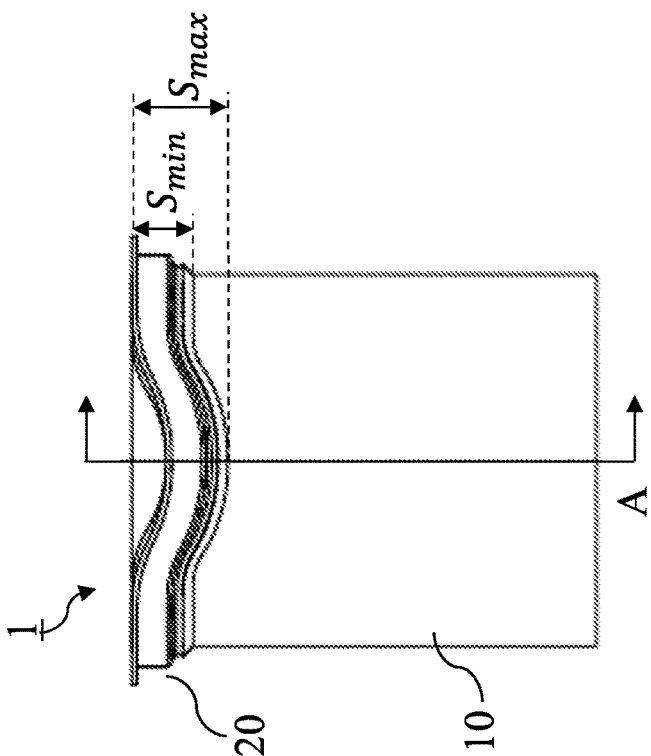
Figure 7A:
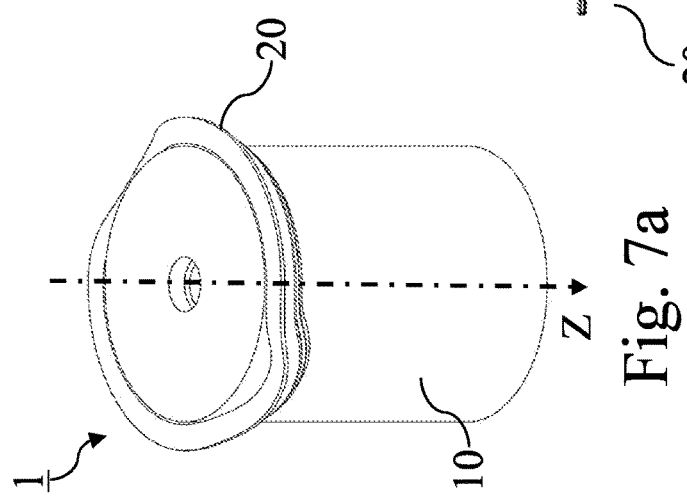
Figure 8D:
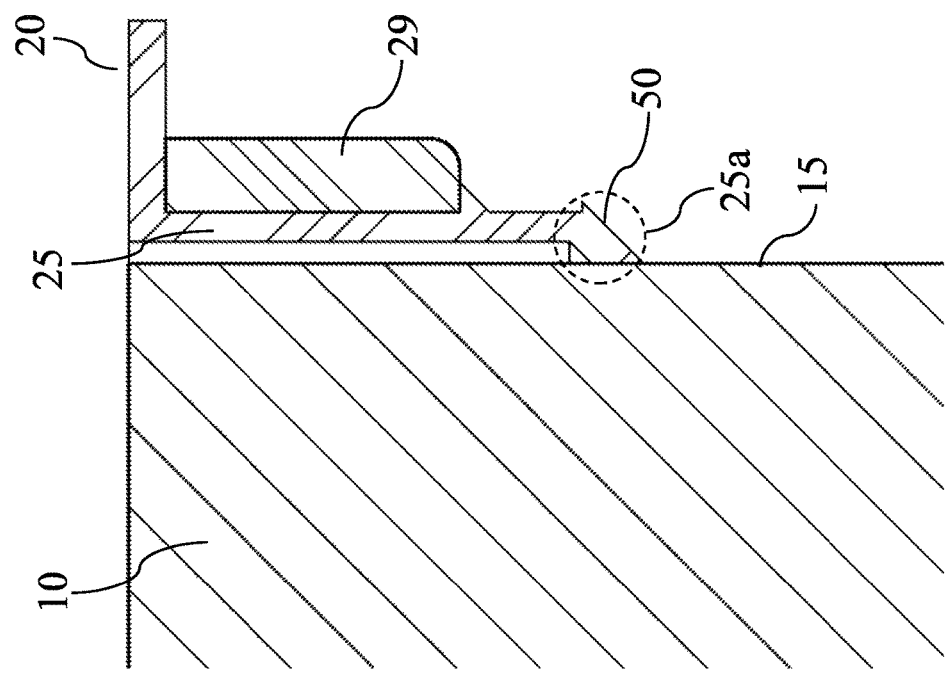
FIG. 8a to FIG. 8d illustrate respectively an isometric view, a side view, an enlarged isometric view and a portion of a projection on a cross-plane of a filter element according to the present disclosure wherein the shell member comprises a welding imprint having a chamfered shape and one or more split-lines.
Figure 8C:
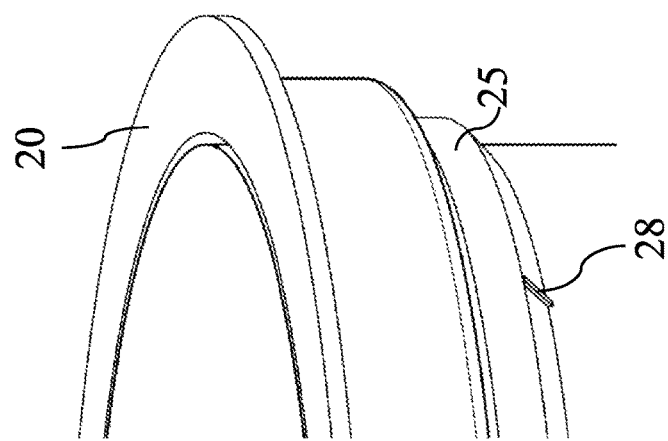
Figure 8A:
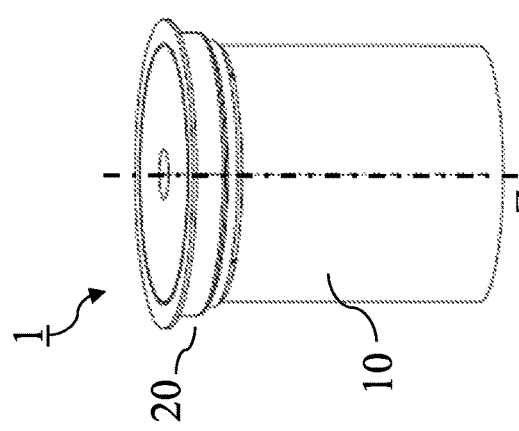
Figure 8B:
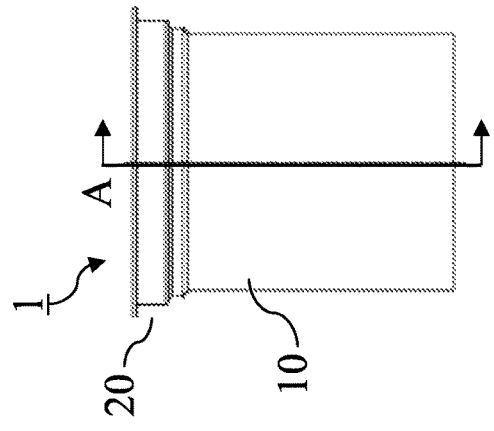

In embodiments, the portion 25a of the shell member that is welded to the circumferential face of the filter medium pack is not necessarily a circular portion. Hence, the circumferential welded portion forming a circumferential leak-tight joint is not necessarily circular. With reference to FIG. 7a to FIG. 7c an isometric view, a side view and a portion of a projection on a cross-plane A of an example of a filter element according to the present disclosure is shown. As illustrated on FIG. 7a and FIG. 7b, the portion 25a of the shell member that is welded is not circular. As a result, the visual welding imprint on the outer surface of the shell member is also non-circular. In the embodiment shown on FIG. 7a to FIG. 7c, the seal member 29 is also not circular and the portion 25a of the shell member that is welded follows the shape of the seal member 29. On FIG. 7c, the support arrangement 20 is encircled with a dashed-dotted line.

In embodiments, as illustrated on FIG. 7b, a separation distance measured along the longitudinal direction Z from the fluid inlet flow face 11 to the circumferential leak-tight joint is varying as function of an azimuthal angular position of the leak-tight joint on the filter medium pack, preferably the separation distance is varying between a minimum $S_{min}$ and a maximum $S_{max}$ separation distance.

In embodiments, as illustrated on FIG. 3a, the circumferential portion 25a of the shell member that is welded to the circumferential face 15 of the filter medium pack corresponds to a circumferential edge of the shell member. In other embodiments the welded circumferential portion 25a of the shell member is a centre portion of the shell member, as for example schematically illustrated on FIG. 3c. In further embodiments an entire circumferential surface of shell member is welded to the filter medium pack.

Generally, as a result of the welding process, an imprint and/or one or more indentations are visible on the outer surface of the shell member 25, indicating where or what portion 25a of the shell member has been welded to the circumferential face of the filter medium pack. The specific imprint or indentation observed depends on the tools used during the manufacturing process for welding the shell member to the filter medium pack, as will be further discussed below. Hence, the imprints or indentations can be construed as welding imprints or welding indentations.

In embodiments, a welding imprint 50 entirely circumscribes an outer surface of the shell member 25. In other embodiments, a welding imprint 50 only partly circumscribes an outer surface of the shell member 25.

In embodiments, an outer surface of the shell member that is thermally welded to the circumferential face 15 of the filter medium pack comprises one or more individual indentations.

In other embodiments, an outer surface of shell member that is thermally welded to the circumferential face 15 of the filter medium pack comprises a circumferential imprint 50 or a partly-circumferential imprint, as illustrated on for example FIG. 5c, FIG. 6c, FIG. 7c, FIG. 8d, FIG. 9c, FIG. 10c, and FIG. 11c.

In embodiments, the outer surface of the shell member comprises a V-shaped or U-shaped imprint forming a groove.

In other embodiments, as shown for example on FIG. 5c, FIG. 6c, FIG. 7c, and FIG. 8d wherein the portion of the shell member that is welded to the circumferential face 15 of the filter medium pack is an end portion of the shell member 25, the imprint 50 resulting from the welding process has the shape of a circumferential chamfered edge.

Figure 9C:
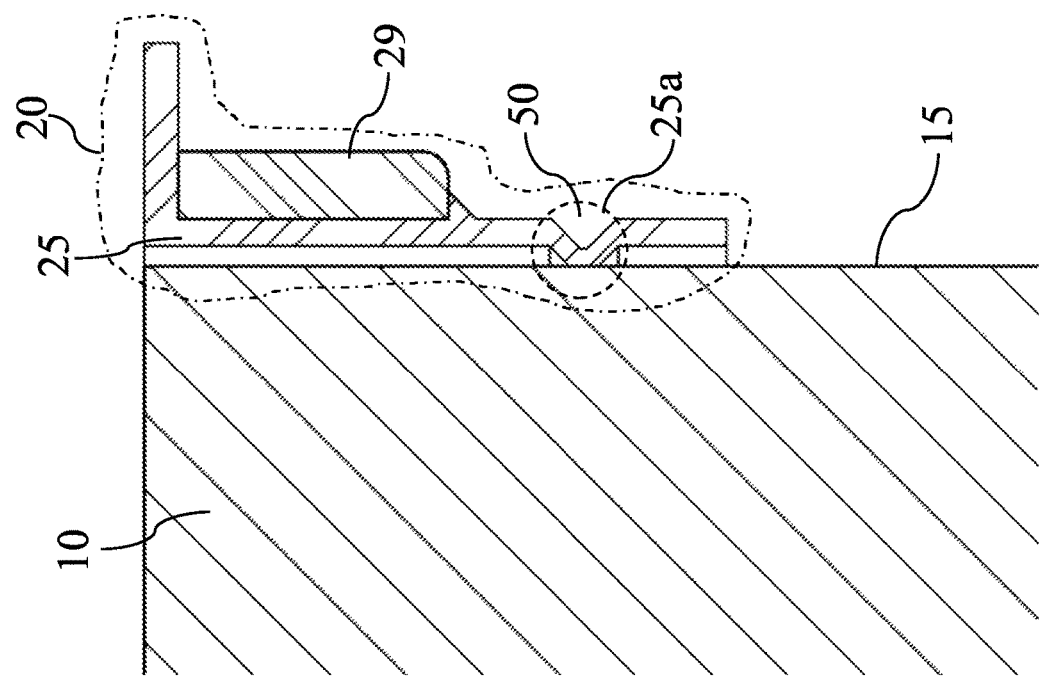
FIG. 9a to FIG. 9c illustrate respectively an isometric view, a side view and a portion of a projection on a cross-plane of a filter element according to the present disclosure wherein the shell member comprises a V-shaped welding imprint.
Figure 9B:
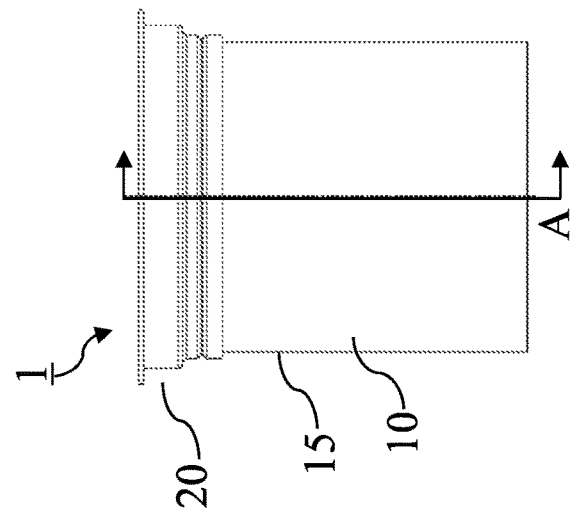
Figure 9A:
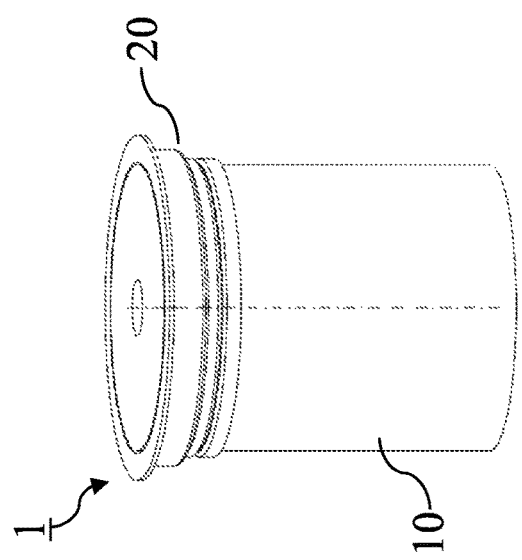

With reference to FIGS. 9a to 9c, an isometric view, a side view and a portion of a projection on a cross-plane of a filter element according to the present disclosure is shown. On FIG. 9c, a portion of a projection on the cross-plane A, indicated on FIG. 9b, is shown. The dashed circle on FIG. 9c indicates the location where a circumferential portion 25a of the shell member 25 is welded to the circumferential face 15 of the filter medium pack. As illustrated, the welding imprint 50 on the outer surface of the shell member 25 has the shape of a single V.

Figure 11C:
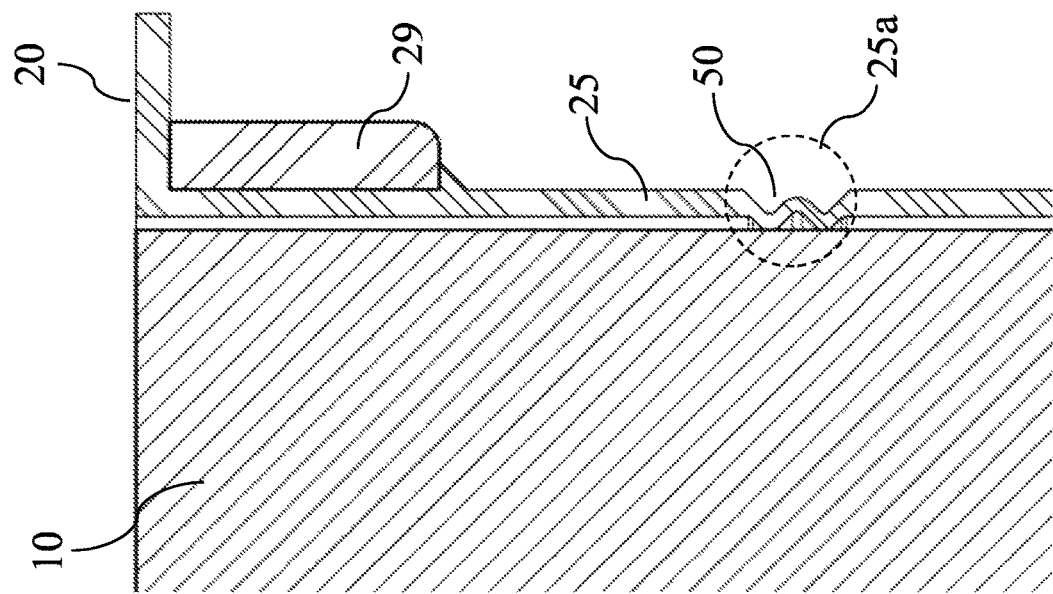
FIG. 11a to FIG. 11c illustrate respectively an isometric view, a top view and a portion of a projection on a cross-plane of a of a filter element according to the present disclosure wherein the shell member comprises a double V-shaped welding imprint.
Figure 11B:
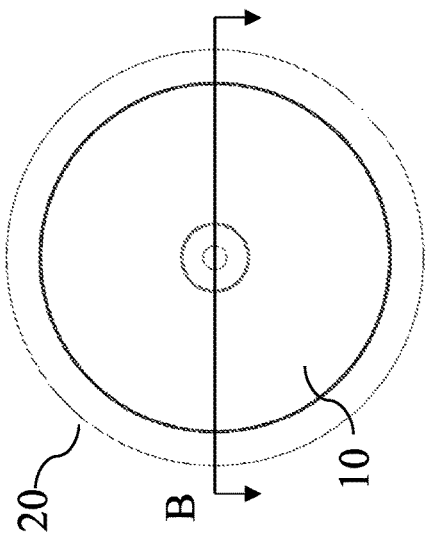
Figure 11A:
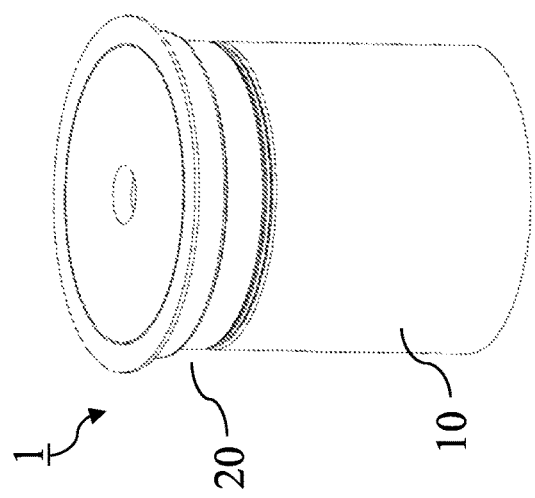

With reference to FIGS. 11a to 11c, an isometric view, a top view and a portion of a projection on a cross-plane of a filter element according to the present disclosure is shown. On FIG. 11c a portion of a projection on the cross-plane B indicated on FIG. 11b is shown. The dashed circle on FIG. 11c indicates the location where a circumferential portion 25a of the shell member 25 is welded to the circumferential face 15 of the filter medium pack. As illustrated, the weld imprint 50 on the outer surface of the shell member 25 has the shape of a double V.

With reference to FIGS. 12a to 12c an isometric view, a side view and a portion of a projection on a cross-plane of a filter element according to the present disclosure is shown wherein the support arrangement 20 of the filter element comprises besides the shell member 25 and the seal member 29 also a flange member 24. On FIG. 12c, a portion of a projection on the cross-plane A as indicated on FIG. 12b is shown. On FIG. 12c, the support arrangement 20 is encircled with a dashed-dotted line and the dashed circle indicates the location where a circumferential portion 25a of the shell member 25 is welded to the circumferential face 15 of the filter medium pack 10. As illustrated, the flange member 24 is partly covering an edge portion of the flow face of the filter medium pack. This increases the robustness of the filter medium pack. In embodiments, the flange member 24 shown on FIG. 12c can receive a seal, for example for sealing against a pre-cleaner or a cover seal.

A support arrangement 20 comprising a shell member 25 and a flange member 24 can also be named end cap. With reference to FIG. 23a and FIG. 23b, two examples are shown of embodiments of a portion of a support arrangement 20 comprising a shell member 25 and a flange member 24 forming an end cap.

With reference to FIGS. 13a to 13c an isometric view, a side view and a portion of a projection on a cross-plane of a filter element according to the present disclosure is shown wherein the support arrangement 20 of the filter element further comprises a flange member 24 and four notches 23 coupled with an edge portion of a flow face of the filter medium pack. On FIG. 13c, the support arrangement 20 is encircled with a dashed-dotted line. The notches 23 make the filter element more robust. In this way, protection is provided on the inflow face, e.g., when during a maintenance procedure tapping the pack to empty it from dust.

Figure 14C:
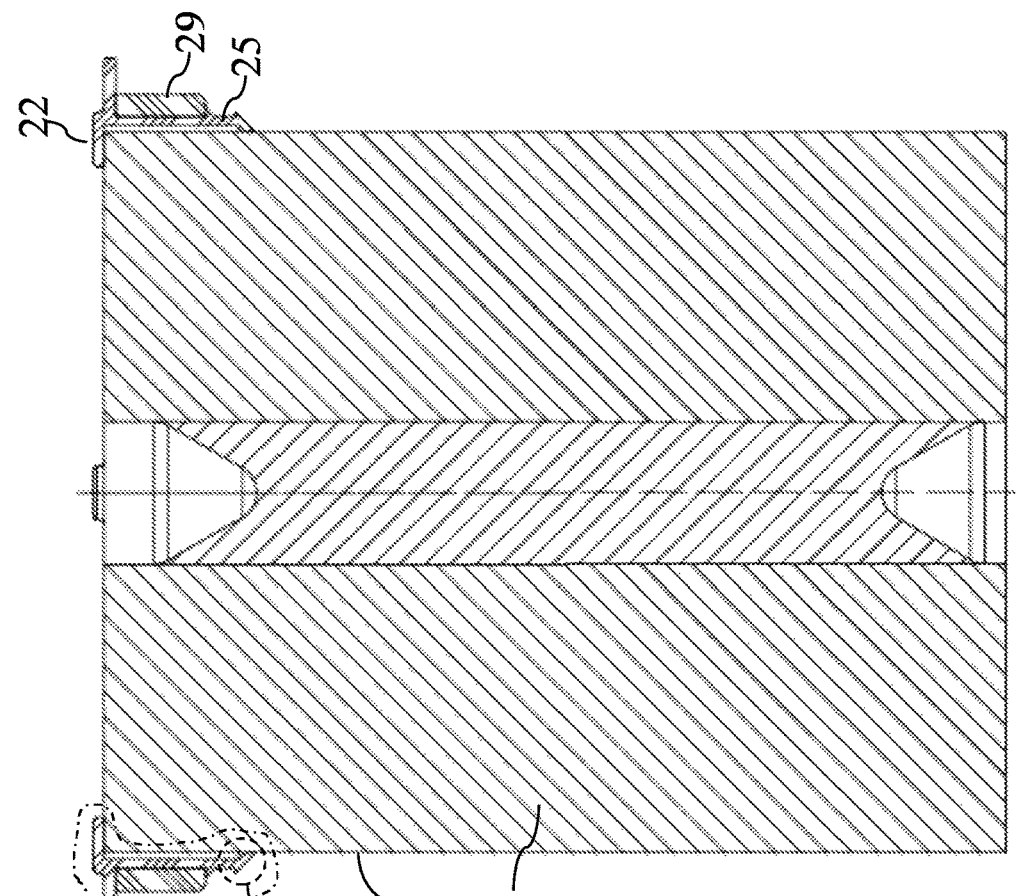
FIG. 14a to FIG. 14c illustrate respectively an isometric view, a side view and a portion of a projection on a cross-plane of a filter element according to the present disclosure wherein the support arrangement of the filter element comprises an anti-telescope member.
Figure 14B:
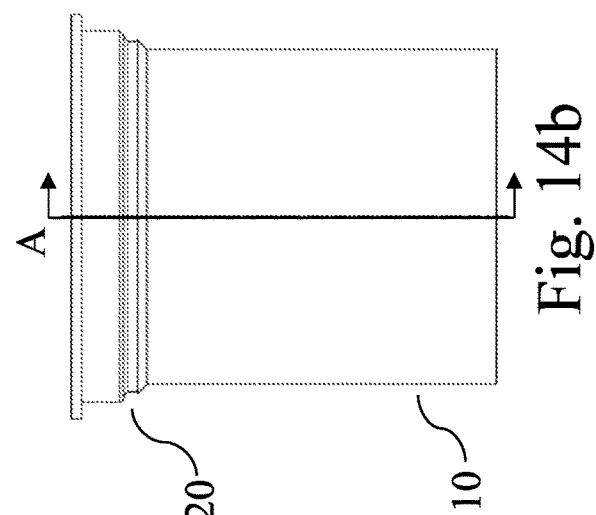
Figure 14A:
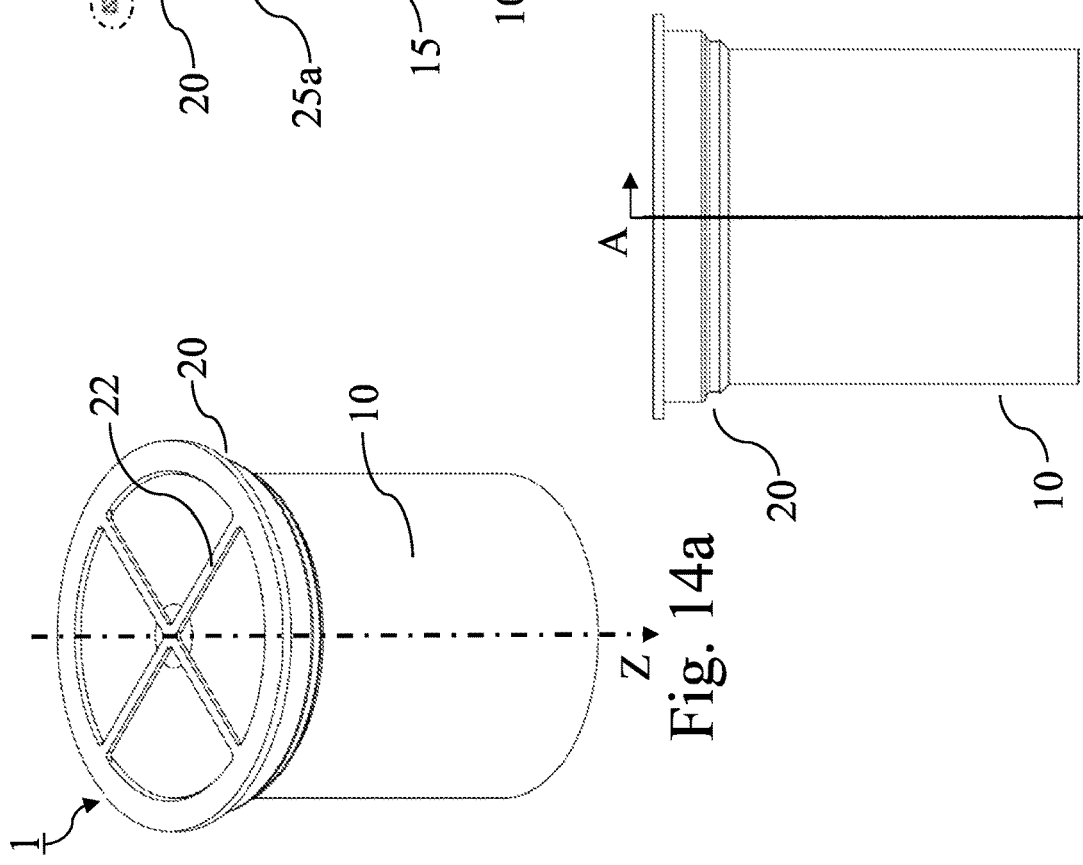

With reference to FIGS. 14a to 14c an isometric view, a side view and a portion of a projection on a cross-plane of a filter element according to the present disclosure is shown wherein the support arrangement 20 of the filter element further comprises an anti-telescope member 22. On FIG. 14c, the support arrangement 20 comprising the anti-telescope member 22 is encircled with a dashed-dotted line. The anti-telescope member 22 is configured to avoid coiled layers from moving in the longitudinal direction Z. As illustrated on FIG. 14a, the anti-telescope member comprises one or more ribs attached to a flow face of the filter medium pack.

With reference to FIGS. 15a to 15c an isometric view, a side view and a portion of a projection on a cross-plane of a filter element according to the present disclosure is shown wherein the support arrangement of the filter element further comprises a flange 24 having a collar member extending in the longitudinal direction Z.

For filter medium packs including coiled layers of filter media, the circumferential face of the filter medium pack is an outer surface of the outer layer of the coiled layers of filter media and hence the thermal welding is directly attaching the circumferential portion 25a of the shell member to an outer surface of the outer layer of filter media. In other words, there is no need to additionally surround the filter media with an additional plastic casing before attaching the support arrangement to the filter medium pack.

In embodiments, the filter medium pack comprises a plastic wrap for protecting the filter media and in these embodiments, an outer surface of the plastic wrap is forming the circumferential face 15 of the filter medium pack 10. The plastic wrap around the filter media makes the filter element more robust.

In embodiments, the filter medium pack comprises coiled layers 5 of filter material and an outer layer of the coiled layers is covered by a plastic wrap 13. In these embodiments, an outer surface of the plastic wrap 13 is forming the circumferential face 15 of the filter medium pack 10.

In embodiments comprising a plastic wrap, the plastic wrap is glued to the filter material. In other embodiments the plastic wrap is welded to the filter material as further discussed below.

With respect to FIG. 18a to FIG. 18c, an isometric view, a side view and a portion of a projection on a cross-plane of a filter element according to the present disclosure is shown wherein the filter medium pack 10 comprises a plastic wrap 13 surrounding the filter material and wherein an outer surface of the plastic wrap is forming the circumferential face 15 of the filter medium pack.

In embodiments, the shell member or at least the circumferential portion 25a of the shell member welded to the filter medium pack is made of a thermoplastic material. The material may include any of the following non-limiting list of materials: acrylonitrile butadiene styrene (ABS), polypropylene (PP), polyamide (PA), polyethylene terephthalate (PET), polylactic acid (PLA), polyethylene (PE), polycarbonate (PC), polystyrene (PS), or polyvinyl chloride (PVC), or mixtures and combinations thereof.

In some embodiments, the material of the shell member or at least the circumferential portion 25a of the shell member may further include a glass fiber or a mineral or a combination thereof. Exemplary polyamides include polyamide 6 (PA6) and polyamide 66 (PA66). The material may additionally or alternatively include any other material suitable for thermal welding.

In embodiments where the shell member 25 or at least the circumferential portion 25a of the shell member include a polypropylene, the shell member or at least the circumferential portion of the shell member may include a polypropylene random copolymer including, for example, DuPure® QR 50 AV (DUCOR Petrochemicals, the Netherlands) or DuPure® QR 76 AV (DUCOR Petrochemicals, the Netherlands); a random polypropylene including heterophasic copolymers additives including, for example, CAPILENE® CL 50 E (Carmel Olefins, Ltd., Israel); or Polystone® P Homopolymer (Rochling Engineering Plastics, Germany).

In some embodiments, a material or combination of materials for forming the shell member and/or for forming the circumferential portion of the shell member, may be selected based on the desired Shore hardness of the material.

In some embodiments, the shell member or at least the circumferential portion of the shell member has a Shore A value of at least 50, at least 60, at least 70, at least 80, or at least 90.

In some embodiments, the shell member or at least the circumferential portion of the shell member has a Shore A value of up to 80, up to 90, up to 95, or up to 100.

In an exemplary embodiment, the shell member or at least the circumferential portion of the shell member has a Shore A value in a range of 60 to 100.

In another exemplary embodiment, the shell member and/or the circumferential portion of the shell member has a Shore A value in a range of 70 to 100.

In yet another exemplary embodiment, the shell member or at least the circumferential portion of the shell member has a Shore A value in a range of 80 to 100.

The Shore A value is for example determined as described in ASTM D2240-15e1, entitled "Standard Test Method For Rubber Property—Durometer Hardness".

Examples of Support Arrangements

In embodiments according to the present disclosure, the support arrangement 20 is a seal arrangement. In these embodiments, the shell member 25 or at least a part of the shell member 25 is forming a seal carrier for supporting a seal member. The seal carrier is to be construed as a seal frame for supporting a seal member.

In embodiments wherein the support arrangement is a seal arrangement, the seal member can for example be a gasket that can removably be placed on the seal carrier.

In preferred embodiments, the support arrangement 20 is a moulded single-structure seal arrangement that comprises, besides the shell member 25, also a seal member. In these preferred embodiments, the shell member 25 or at least a portion of the shell member is forming a seal carrier for the seal member. Such a moulded single-structure seal arrangement comprising the seal member and the seal carrier is configured for separating filtered from unfiltered fluid when the filter element is operationally placed in a housing of a filter system.

The embodiments of support arrangements 20 shown for example on FIG. 4c, FIG. 5c, FIG. 6c, FIG. 7c, FIG. 8d, and FIG. 9c can be moulded single-structure seal arrangements comprising the shell member 25 and the seal member 29. On these figures, the seal arrangement 20 is encircled with a dashed-dotted line.

In embodiments wherein the support arrangement is a moulded single-structure seal arrangement, the seal member and seal carrier are made of respectively a first and second material, wherein the second material is different from the first material. The seal member is typically formed of a softer material and the seal carrier is typically formed of a harder material. Examples of each of those materials are further described herein. Examples of the first material for the seal carrier have been discussed above and correspond to the examples of materials given for the shell member 25.

In some embodiments having a moulded single-structure seal arrangement, the seal member and/or the seal carrier, may be made of more than one material.

In embodiments, the seal member is made of any of the following non-limiting list of materials: a rubber including an unsaturated rubber or a saturated rubber; a thermoplastic elastomer; a thermoset elastomer; a thermoplastic vulcanizate; or a mixture or combination thereof. Exemplary thermoplastic elastomers (TPEs) include a polyamide TPE, a copolyester TPE, an olefinic TPE, a styrenic TPE, a urethane TPE, or a dynamically vulcanized TPE, or a mixture or combination thereof.

In some embodiments, the material for forming the seal member may be selected based on the desired Shore hardness of the resulting seal. In some embodiments, the seal member has a Shore A value of at least 25, at least 30, at least 35, at least 40, at least 45, at least 50, at least 55, or at least 60.

In some embodiments, the seal member has a Shore A value of up to 40, up to 45, up to 50, up to 55, up to 60, up to 65, up to 70, up to 75, up to 80, up to 85, or up to 90.

In an exemplary embodiment, the seal member has a Shore A value in a range of 30 to 90.

In another exemplary embodiment, the seal member has a Shore A value in a range of 40 to 70.

In yet another exemplary embodiment, the seal member has a Shore A value in a range of 50 to 70.

In some embodiments, the Shore A value is determined as described in ASTM D2240-15e1, entitled "Standard Test Method For Rubber Property—Durometer Hardness." The Shore A value of the seal carrier is preferably determined in the fully formed filter element—that is, after the coupling of the seal to the seal carrier and after the thermal welding of the seal carrier to the filter medium pack.

In contrast to U.S. Patent Publication No. 2009/0320424 which teaches using a soft urethane foam for a seal member that forms an interface between a filter element and a filter housing to prevent unfiltered fluids from passing between the filter element and the fluid housing, the seal member disclosed herein is formed by a multi-material injection molding manufacturing process, as further described herein. In addition, U.S. Patent Publication No. 2009/0320424 teaches the Shore A value of the seal member is less than 25. Furthermore, when the seal member includes a thermoplastic polymer as described herein instead of a urethane seal member as described in U.S. Patent Publication No. 2009/0320424, advantages may be obtained in both manufacturing and use. In contrast to a urethane seal member, which must be cured, a seal member formed from a thermoplastic polymer by a multi-material injection molding manufacturing process does not require curing, increasing the efficiency of the manufacturing process. Moreover, a seal member formed by a multi-material injection molding manufacturing process may be stable at higher temperatures (for example, up to 140° C.) compared to a urethane seal member (which is typically stable only to about 80° C.), potentially providing greater stability during some uses during which the filter element is exposed to hot conditions. For example, some filter elements installed in engine compartments may be exposed to temperatures greater than 80° C. (for example, up to 90° C.) during use.

Exemplary unsaturated rubbers include natural polyisoprene including, for example, cis-1,4-polyisoprene natural rubber (NR) and trans-1,4-polyisoprene gutta-percha; synthetic polyisoprene (also referred to as isoprene rubber (IR)); polybutadiene (also referred to as butadiene rubber (BR)); chloroprene rubber (CR) including, for example, polychloroprene, Neoprene, Baypren, etc.; butyl rubber (also known as isobutylene-isoprene (IIR)); halogenated butyl rubbers including chloro butyl rubber (CIIR) and bromo butyl rubber (BIIR); styrene-butadiene rubber (SBR); nitrile rubber (also known as NBR, Buna N, or acrylonitrile butadiene rubber); hydrogenated nitrile butadiene rubbers (HNBR) including, for example, Therban and Zetpol.

Exemplary saturated rubbers include ethylene propylene rubber (EPM), a copolymer of ethylene and propylene; ethylene propylene diene (EPDM) rubber, a terpolymer of ethylene, propylene and a diene-component; epichlorohydrin rubber (ECO); polyacrylic rubber (ACM, ABR); silicone rubber (SI, Q, VMQ); fluorosilicone rubber (FVMQ); the FKM and FEPM families of fluoroelastomers including, for example, VITON, TECNOFLON, FLUOREL, AFLAS, and DAI-EL; perfluoroelastomers (FFKM) including, for example, TECNOFLON PFR, KALREZ, CHEMRAZ, PERLAST; polyether block amides (PEBA); chlorosulfonated polyethylene (CSM) including, for example, HYPALON; and ethylene-vinyl acetate (EVA).

Exemplary polyamide TPEs include a polyamide TPE including a soft segment with both ether and ester linkages (TPA-EE), a polyamide TPE including a polyester soft segment (TPA-ES), or a polyamide TPE including a polyether soft segment (TPA-ET), or mixtures or combinations thereof. Exemplary commercially available polyamide TPEs include PEBAX® and VESTAMID® E.

Exemplary copolyester TPEs include a copolyester TPE including a soft segment with both ether and ester linkages (TPC-EE), a copolyester TPE including a polyester soft segment (TPC-ES), or a copolyester TPE including a polyether soft segment (TPC-ET), or mixtures or combinations thereof. Exemplary commercially available copolyester TPEs include ARNITEL®, HYTREL®, PIBIFLEX®, and RITEFLEX®.

Exemplary olefinic TPEs include a blend of a polyolefin and a conventional rubber, the rubber phase in the blend having little or no crosslinking (TPO). Exemplary commercially available olefinic TPEs include APIGO®, and ENFLEX-O.

Exemplary styrenic TPEs include a block copolymer of styrene and butadiene (TPS-SBS), a poly styrene-poly(ethylene-butyl ene)-poly styrene (TPS-SEBS), a polystyrene-poly(ethylene-propylene)-polystyrene (TPS-SEPS), or a block copolymer of styrene and isoprene (TPS-SIS), or mixtures or combinations thereof. Exemplary commercially available styrenic TPEs include SOFPRENE®, ELASTRON®, KRATON™, LAPRENE®, and THERMOLAST®.

Exemplary urethane TPEs include an urethane TPE including an aromatic hard segment and a polyester soft segment (TPU-ARES), a urethane TPE including an aromatic hard segment and a polyether soft segment (TPU-ARET), a urethane TPE including an aromatic hard segment and a soft segment with ester and ether linkages (TPU-AREE), a urethane TPE including an aromatic hard segment and a polycarbonate soft segment (TPU-ARCE), a urethane TPE including an aromatic hard segment and a polycaprolactone soft segment (TPU-ARCL), a urethane TPE including an aliphatic hard segment and a polyester soft segment (TPU-ALES), or a urethane TPE including an aliphatic hard segment and a polyether soft segment (TPU-ALET), or mixtures or combinations thereof. Exemplary commercially available urethane TPEs include DESMOPAN®, ELASTOLLAN®, and SOFPUR®.

Exemplary dynamically vulcanized TPEs include a combination of ethylene propylene diene monomer (EPDM) rubber and polypropylene in which the EPDM phase is highly crosslinked and finely dispersed in a continuous polypropylene phase (TPV-EPDM+PP), a combination of acrylonitrile-butadiene rubber (NBR) and polypropylene in which the NBR phase is highly crosslinked and finely dispersed in a continuous polypropylene phase (TPV-(NBR+PP)), a combination of natural rubber (NR) and polypropylene in which the NR phase is highly crosslinked and finely dispersed in a continuous polypropylene phase, a combination of epoxidized natural rubber (ENR) and polypropylene in which the ENR phase is highly crosslinked and finely dispersed in a continuous polypropylene phase (TPV-(ENR+PP)), or a combination of butyl rubber (also known as isobutylene-isoprene (IIR)) and polypropylene in which the butyl rubber phase is highly crosslinked and finely dispersed in a continuous polypropylene phase (TPV-(IIR+PP)), or mixtures or combinations thereof. Exemplary commercially available dynamically vulcanized TPEs include DRYFLEX®, ELASTRON®, SANTOPRENE™, SARLINK®, FORPRENE®, and THERMOLAST®. In one exemplary embodiment, the seal may include SARLINK® TPV 4155B03, a dynamically vulcanized TPE from Teknor Apex Company (Pawtucket, Rhode Island).

Other commercially available TPEs that may be suitable in some embodiments include BERGAFLEX™.

The support arrangement welded to the filter medium pack according to the present disclosure is however not limited to seal arrangements. In embodiments, the support arrangement is for example an anti-telescopic member configured to avoid the coiled layers from moving in the longitudinal direction Z.

In other embodiments, the support arrangement welded to the filter medium pack is a support structure comprising one or more handles to carry the filter medium pack.

In embodiments, the filter element 1 comprises a first 20a and a second 20b support arrangement wherein the first and second support arrangement are thermally welded to the circumferential face of the filter medium pack. The first and second support arrangement can be located at respectively a first and second end of the filter medium pack. The first support element can for example be a seal arrangement and the second support arrangement can for example be an anti-telescopic member.

With reference to FIGS. 16a to 16c, an isometric view, a side view and a portion of a projection on a cross-plane of a filter element is shown wherein the filter element 1 comprises a first 20a and a second 20b support arrangement welded to respectively a first end and a second end of the filter medium pack. The two dashed circles indicate where respectively a first portion 25a of the shell member 25 of the first support arrangement 20a and a second portion 25b of the shell member 25 of the second support arrangement are welded to the circumferential face 15 of the filter medium pack. In this embodiment, the first support arrangement 20a is a seal arrangement comprising besides the shell member 25 also a seal member 29. The second support arrangement 20b comprises besides the shell member 25 also a flange member 24.

With reference to FIGS. 17a to 17c, a further example of an embodiment of a filter element 1 comprising a first 20a and a second 20b support arrangement is shown. This embodiment is the same as shown on FIGS. 16a to 16c, except that in this embodiment the second support arrangement 20b comprises one or more handles 21, in this example two handles. These handles allow to carry the filter element and facilitate installation of the filter element in a housing. In this embodiment, the second support arrangement 20b also comprises a flange member 24 and the handles 21 are attached to the flange member, as illustrated on FIG. 17a.

As discussed above and as illustrated for example on FIG. 23a and FIG. 23b, a support arrangement 20 can, besides the shell member 25, also comprise a flange member 24. Such a support arrangement 20 forms an end cap for the filter medium pack.

In the embodiment shown on FIG. 23a, the shell member 25 is a straight shell member wherein an end portion 25a of the straight shell member is that portion of the shell member that is to be thermally welded to the filter medium pack. The shell member 25 has for example the shape of a hollow cylinder wherein the inner diameter of the shell member is selected to be larger than an outer diameter of the circumferential face 15 of the filter medium pack such that during the manufacturing process, as discussed below, after heating the portion 25a of the shell member 25 to be welded, the shell member 25 can glide over the filter medium pack 10.

In other embodiments as illustrated on FIG. 23b, the shell member 25 is not entirely a straight shell member. As illustrated on FIG. 23b, the shell member 25 comprises a chamfered portion 25c and the chamfered portion is chamfered by an angle α with respect to the longitudinal direction Z, for example by an angle of 30°. By providing a shell member 25 with a chamfered portion 25c, an inner dimension, e.g., an inner diameter, of the shell member can vary in the longitudinal direction as illustrated on FIG. 23b. In the embodiment shown on FIG. 23b, the shell member comprises a first portion, for example a first cylindrical portion having a first inner diameter D1 and a second portion, for example a second cylindrical portion having an inner diameter D2 that is larger than the inner diameter D1 of the first cylindrical portion. The second portion with the larger inner diameter D2 is the end portion of the shell member and is that portion 25a of the shell member 25 that is to be welded to the filter medium pack. In other words, the provision of a chamfered portion 25c allows to enlarge an inner dimension of the end portion of the shell member, which is that portion 25a of the shell member that is to be welded to filter medium pack. An end portion 25a of the shell member having a larger inner dimension, e.g., a larger inner diameter, facilitates the manufacturing process wherein the shell member is to be glided over the filter medium pack, as further discussed below.

Method of Manufacturing Filter Elements

The present disclosure also describes methods of manufacturing a filter elements 1 comprising a filter medium pack 10 having a circumferential face 15 extending in a longitudinal direction Z from a fluid inlet flow face 11 to an opposing fluid outlet flow face 12. With the present manufacturing method, a support arrangement 20 is welded to the circumferential face 15 of the filter medium pack 10. As discussed above, the support arrangement can for example be a seal carrier for supporting a seal member or the support arrangement can be a moulded single-structure seal arrangement comprising a seal carrier and a seal member.

The method according to the present disclosure comprises: providing the support arrangement 20 comprising a shell member 25 configured for circumscribing the circumferential face 15 or at least a part of the circumferential face 15 of the filter medium pack, heating at least a portion 25a of the shell member 25, positioning the shell member 25 around the circumferential face 15 of the filter medium pack, pushing the heated portion 25a of the shell member or at least part of the heated portion of the shell member against the circumferential face 15 of the filter medium pack, and allowing the circumferential portion 25a of the shell member to cool down.

Thermal welding is also referred to as plastic welding, thermal fusion, contact bonding, or direct bonding.

Generally, by first heating the circumferential portion to be welded and then pushing the circumferential portion against the circumferential face of the filter medium pack, molecules of the circumferential portion and molecules of the outer surface of the filter medium pack intertwine and bond together on cooling. In this way a secure and generally air-tight attachment between the circumferential face of the filter medium pack and the support arrangement may be obtained. The skilled person will optimize parameters such as processing temperature and cool down time for obtaining a secure attachment.

In embodiments wherein the portion 25a of the shell member to be welded is a circumferential portion, when pushing the heated portion 25a of the shell member against the circumferential face 15 of the filter medium pack a circumferential spacing between the shell member 25 and the circumferential face 15 of the filter medium pack becomes sealed off. Indeed, as the shell member 25 is to be positioned around the circumferential face 15 of the filter medium pack, there is always a circumferential spacing 19 between the shell member 25 and the circumferential face 15 of the filter medium pack.

With reference to FIG. 19a to FIG. 19f, an exemplary embodiment of the manufacturing method of a filter element according to the present disclosure is schematically illustrated.

Figure 19C:
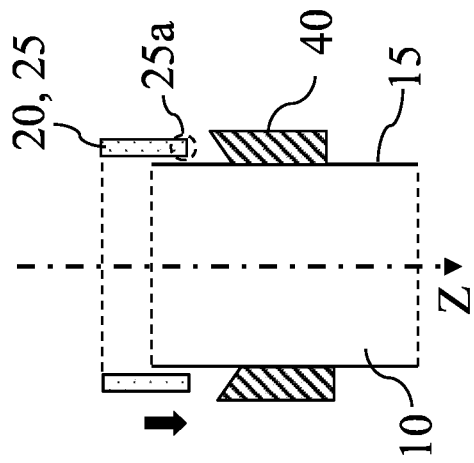
Figure 19B:
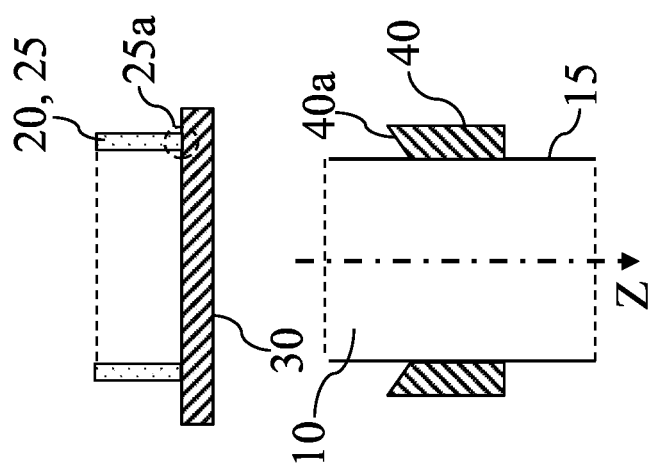
Figure 19A:
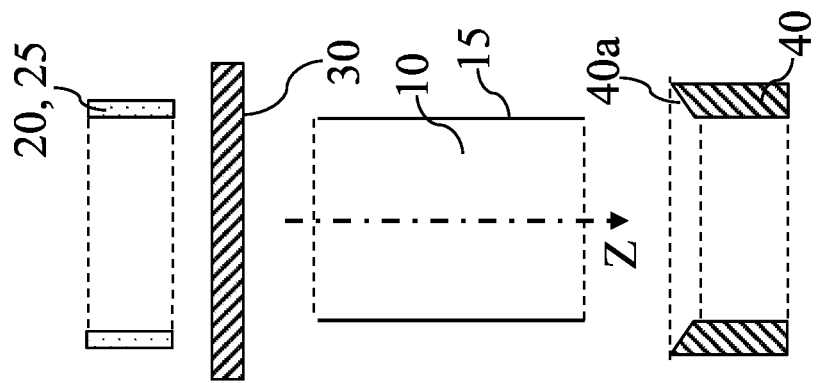

As illustrated on FIG. 19a, a support arrangement 20 that needs to be attached to the circumferential face 15 of the filter medium pack is provided and the support arrangement 20 comprises at least a shell member 25. In this exemplary embodiment, the support arrangement 20 does not comprise other components other than the shell member 25 that is forming a support frame for a seal member. A hot plate 30 is provided as a heating tool and a chamfered jig 40 is provided that is configured for encircling the circumferential face 15 of the filter medium pack. The chamfered jig 40 illustrated on FIG. 19a is a hollow body that can be placed around the filter medium pack and that comprises a chamfered edge 40a.

In the embodiment shown on FIG. 19b, the circumferential portion 25a of the shell member to be welded corresponds to a circumferential edge of the shell member 25. In these embodiments, a circumferential edge of the shell member 25 is heated by the hot plate 30 by placing the hot plate under the support arrangement such that the circumferential edge 25a of the shell member comes in contact with the hot plate 30 and heats up.

As further illustrated on FIG. 19b, the chamfered jig 40 is positioned with respect to the filter medium pack 10 such that the that the circumferential chamfered edge 40a of the jig element is encircling the circumferential face 15 of the filter medium pack and is facing in the longitudinal direction Z towards the circumferential edge 25a of the shell member.

As illustrated on FIG. 19c, after a predefined heating period, the hot plate 30 is removed and the shell member 25 is positioned around the circumferential face 15 of the filter medium pack along the longitudinal direction Z such that at least the circumferential portion 25a of the shell member to be welded encircles the circumferential face of the filter medium pack. The black arrow on FIG. 19c along the longitudinal direction indicates the direction of moving the shell member 25.

Figure 19D:
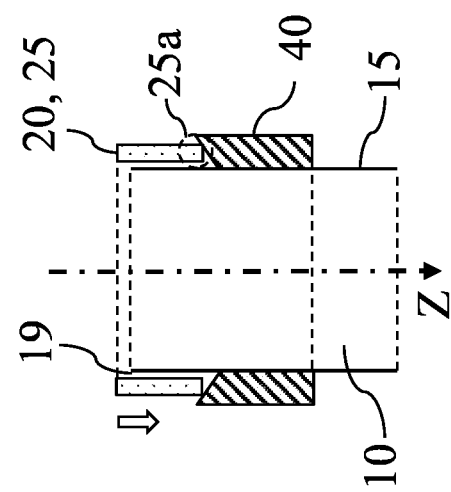
Figure 19E:
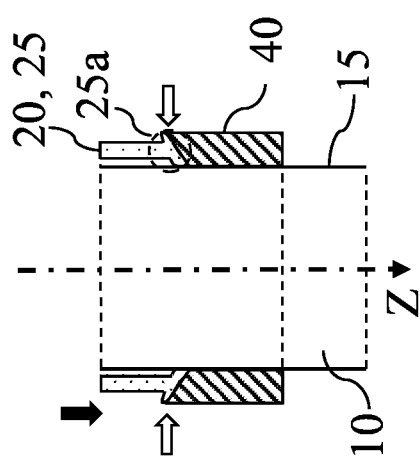

In other words, and as further illustrated on FIG. 19d and FIG. 19e, the shell member 25 is relatively moved with respect to the jig element 40 along the longitudinal direction Z until the chamfered edge of the jig element pushes against the heated circumferential edge of the shell member. As a result, at least a portion of the heated circumferential edge is guided towards the circumferential face of the filter medium pack and thereby fills up the circumferential spacing 19 between the shell member and the circumferential face 15 of the filter medium pack 10.

As further illustrated on FIG. 19e, when the chamfered edge of the jig element pushes against the heated circumferential edge 25a of the shell member, a radial force is generated, as indicated on FIG. 19e with two arrows perpendicular to the longitudinal direction Z.

Figure 19F:
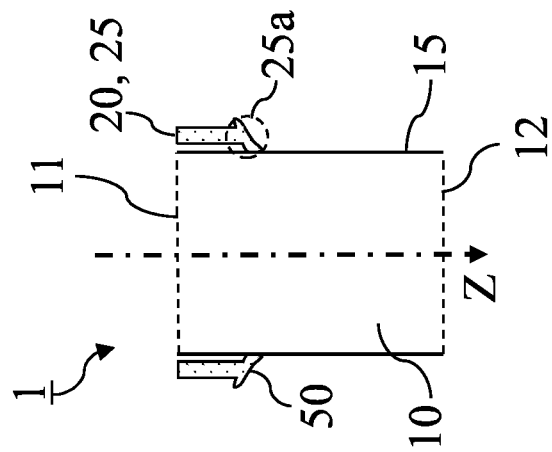

Following a cool down period, allowing the circumferential portion 25a of the shell member to cool down, the jig element 40 is removed from the filter medium pack, completing the manufacturing method of the filter element 1, as illustrated on FIG. 19f. The dashed circle on FIG. 19f indicates a location where a portion 25a of the shell member is welded to the circumferential face 15 of the filter medium pack.

In some embodiments, a jig element comprising two chamfered edges is used. This allows to create two leak-tight joints, e.g., one on each extremity of the shell member 25.

In embodiments wherein the support arrangement 20 is a seal carrier configured for supporting a removeable seal, such as for example a gasket, the seal carrier may be welded to the filter medium pack before placing the seal member on the seal carrier. Alternatively, the seal member can be placed on the seal carrier before starting the welding process.

For heating the circumferential portion of the shell member, any suitable heating technique, other than the hot plate heating technique, can be used.

Other applicable heating techniques are for example infrared heating, hot gas heating, heating by a laser beam, heating by a spin welding technique, mirror heating, vibration heating and friction heating. In some embodiments a combination of different heating techniques may be used for heating up the circumferential portion of the shell member.

In embodiments, as shown on FIG. 19b, wherein for example a hot plate 30 is used for heating the circumferential portion 25a of the shell member, the heating of the circumferential portion 25a of the shell member is performed prior to positioning the shell member 25 of the support arrangement around the circumferential face 15 of the filter medium pack.

In other embodiments, wherein another heating technique is used, such as for example heating with a laser beam or heating with hot air, the heating of the circumferential portion 25a of the shell member may be performed after positioning the shell member 25 of the support arrangement around the circumferential face 15 of the filter medium pack.

As discussed above, in some embodiments the filter medium pack 10 comprises a plastic wrap for protecting the filter material and making the filter element more robust. In these embodiments, an outer surface of the plastic wrap is forming the circumferential face 15 of the filter medium pack or at least a portion of the circumferential face 15 of the filter medium pack is formed by an outer surface of the plastic wrap.

In embodiments wherein the filter medium pack comprises a plastic wrap, the filter element manufacturing method comprises a step of wrapping the plastic wrap around the filter material. In embodiments comprising coiled layers of filter material, the plastic wrap is wrapped around an outer layer of the coiled filter material.

In embodiments, the plastic wrap is glued to the filter material. In other embodiments, the plastic wrap is an adhesive tape that can directly be taped around an outer surface of the filter material. Hence, if the plastic wrap is glued or, alternatively, when an adhesive tape is used, the wrapping with the plastic wrap is performed before applying the thermal welding process discussed above for welding the support arrangement to the filter medium pack.

In further embodiments, a plastic wrap is welded to an outer surface of the filter material, for example welded to the outer layer of coiled layers of filter material. In these embodiments, after positioning the plastic wrap around the filter material, when thermally welding the support arrangement to the filter medium pack as discussed above, at the same time the wrap is welded to the filter material. Generally, in these embodiments, the method comprises heating the plastic wrap or heating at least a portion of the plastic wrap.

The heating of the circumferential portion of the shell member is generally performed until the circumferential portion becomes deformable and the circumferential portion has reached a given processing temperature.

The processing temperature required for thermal welding depends on the specific material chosen for the shell member and/or the material chosen for the circumferential portion of the shell member. The "processing temperature" is the temperature at which the circumferential portion of the shell member intended to be attached to the filter medium pack becomes deformable. The processing temperature is measured by measuring the temperature of the circumferential portion of the shell member that is being heated.

The preferred processing temperature may be selected by a person having skills in the art with reference to the material characteristics of the shell member and/or the circumferential portion of the shell member.

The processing temperature is preferably greater than the glass transition temperature of the material forming the shell member and/or forming the circumferential portion of the shell member intended to be attached to the filter medium pack.

In some embodiments, the processing temperature may be at least 100° C., at least 125° C., at least 150° C., at least 175° C., or at least 200° C. In some embodiments, the processing temperature may be up to 200° C., up to 225° C., up to 250° C., up to 300° C., up to 325° C., or up to 350° C. In an exemplary embodiment, the processing temperature may by in a range of 100° C. to 300° C. In another exemplary embodiment, the processing temperature may be in a range of 150° C. to 300° C. In yet another exemplary embodiment, the processing temperature may be in a range of 200° C. to 300° C.

When the material or combination of materials includes a polymeric fraction as a single phase in the amorphous state (including, for example, a polystyrene (PS) or a polycarbonate (PC)), the glass transition temperature of the material is to be construed as the midpoint temperature ($T_{mg}$) determined using Differential Scanning calorimetry (DSC) according to ASTM D3418-99, entitled "Standard Test Method for Transition Temperatures of Polymers by Differential Scanning calorimetry." The midpoint temperature ($T_{mg}$) is used as a representation of the glass transition temperature ($T_g$) because the glass transition is, in practice, a temperature range. Any suitable instrument may be used to conduct DSC; however, in an exemplary embodiment, a DSC3+ (Mettler-Toledo AG, Schwerzenbach, Switzerland) with a FRS 6+ sensor may be used.

When the material or materials include a semi-crystalline polymeric material or any other materials displaying more than a single polymer phase (including, for example, a polypropylene (PP) or a polyethylene (PE)), the glass transition temperature of the material is defined as the final temperature at which the elastic modulus (G') and the loss modulus (G") intersect, when G' and G" are plotted against temperature from 0° C. to a temperature at which the polymer is in a melt state. G' and G" are defined per ASTM D4092-01, entitled "Standard Terminology for Plastics: Dynamic Mechanical Properties." The rise of tan δ may be used to characterize a system under transition towards the melt flow zone. Herein G' and G" are determined using temperature sweeping dynamic mechanical analysis (DMA) according to ASTM D4440-15, entitled "Standard Test Method for Plastics: Dynamic Mechanical Properties Melt Rheology" using a mechanical spectrometer to measure forced constant amplitude fixed frequency shear oscillation, as further described in ASTM D4065-12, entitled "Standard Practice for Plastics: Dynamic Mechanical Properties: Determination and Report of Procedures." Any suitable dynamic mechanical analyzer may be used; however, in an exemplary embodiment, a Q800 (TA Instruments, New Castle, DE) may be used.

For pushing the heated circumferential portion of the shell member against the filter medium pack, various techniques can be applied other that the jig element with chamfered edge discussed above. The present method is not limited to any specific technique for pushing the heated circumferential portion of the shell member against the circumferential face 15 of the filter medium pack.

In embodiments, for pushing the heated circumferential portion of the shell member against the circumferential face 15 of the filter medium pack 10, a plurality of plates transverse with respect to the longitudinal axis Z are used.

With reference to FIG. 20*a* to FIG. 20*e*, an example of a welding process is shown wherein a plurality of plates 60*a*, 60*b*, 60*c*, 60*d* are used for pushing the heated circumferential portion 25*a* of the shell member against the circumferential face 15 of the filter medium pack. As illustrated on FIG. 20*a*, a plurality of plates 60*a*, 60*b*, 60*c*, 60*d* are positioned around the shell member 25 such that the plates are transverse with respect to the longitudinal axis Z. As further illustrated on FIG. 20*b* to FIG. 20*e*, by moving the plurality of plates such that edge portions of the plates are pushing against the heated circumferential portion 25*a* of the shell member 25, the heated circumferential portion 25*a* of the shell member 25 is pushed against the circumferential face 15 of the filter medium pack 10.

In embodiments, the contour shape of the edge portions of the plates 60*a*, 60*b*, 60*c*, 60*d* are configured to match with the contour shape of the circumferential face 15 of the filter medium pack.

In the embodiment shown on FIG. 20*a* to FIG. 20*e*, two sets of plates are configured for sliding in a plane transverse to the longitudinal direction Z from a pulled-out position towards a pulled-in position. The pulled-out position is illustrated on FIG. 20*a* and FIG. 20*b*, while the pulled-in position is illustrated on FIG. 20*c* and FIG. 20*d*. In this embodiment, a first set of plates comprises two plates 60*a*, 60*b* movable along a first axis and a second set of plates 60*c*, 60*d* moveable along a second axis perpendicular to the first axis. The black arrows on FIG. 20*b* indicate a direction of motion of each plate for moving from the pulled-out position to the pulled-in position and the black arrows on FIG. 20*d* indicate the direction of motion of each plate for moving from the pulled-in position to the pulled-out position. Further, the two sets of plates are axially positioned with respect to the circumferential portion 15 of the shell member and configured such that when sliding the plates towards the pulled-in position, edge portions of the plates are contacting the circumferential portion 25*a* of the shell member 25 to be welded. Hence, by sliding the two sets of plates from the pulled-out position towards the pulled-in position, the edge portions of the plates are pushing against the heated circumferential portion of shell member and at least a portion of the heated circumferential portion is guided towards the circumferential face of the filter medium pack. The circumferential spacing between the shell member and the circumferential face is thereby filled up.

Figure 20E:
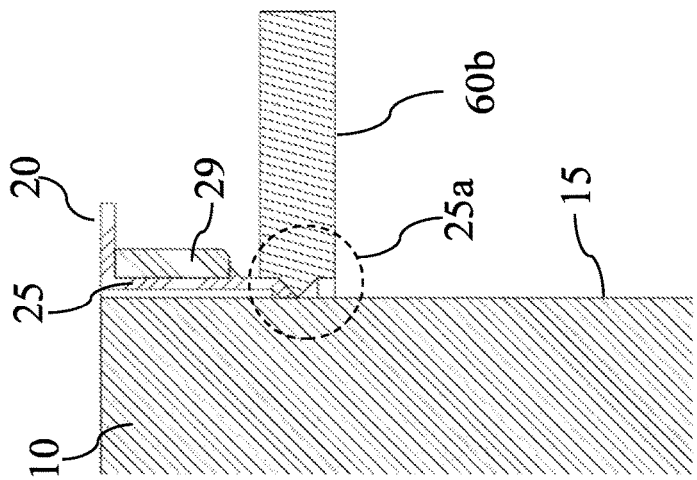
Figure 20B:
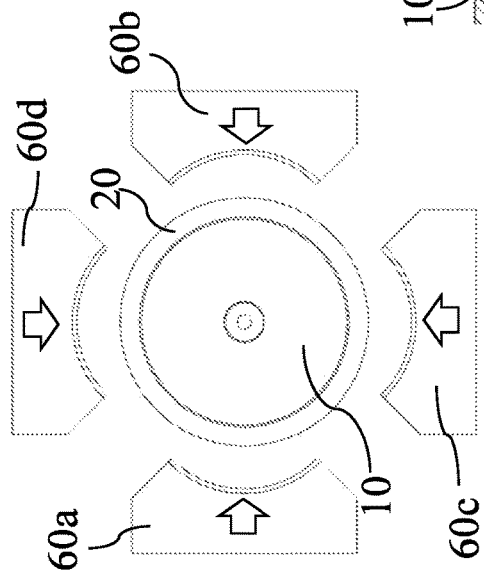
Figure 20D:
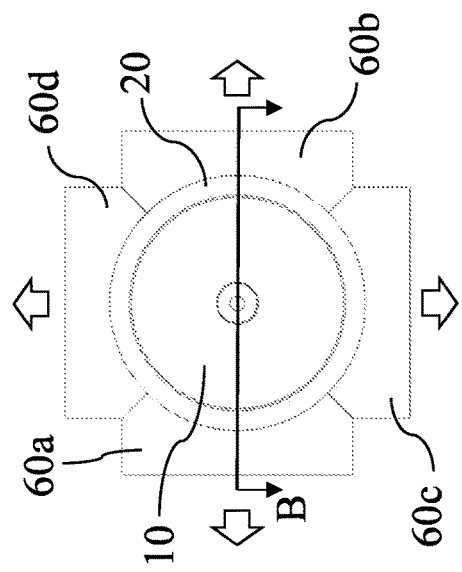
Figure 20A:
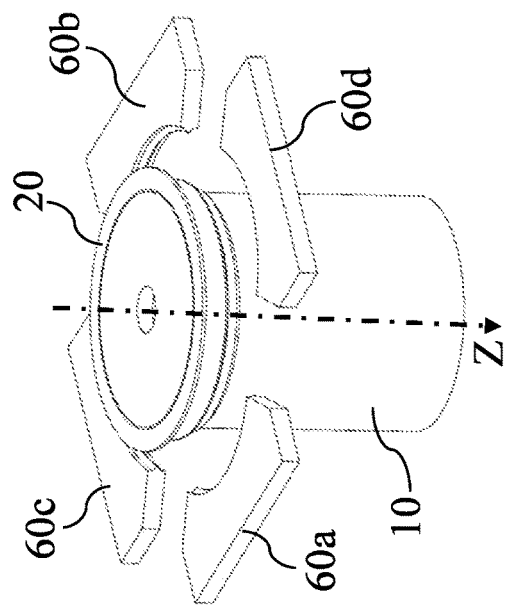
Figure 20C:
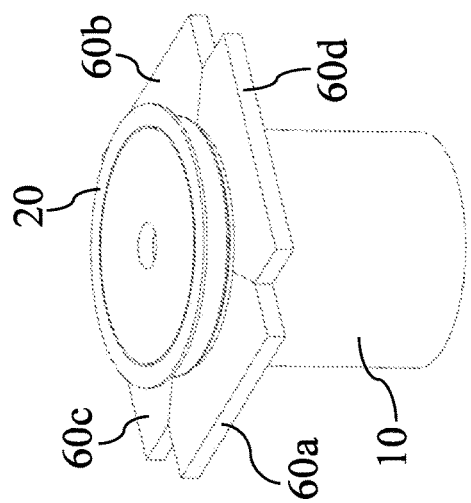

On FIG. 20*e*, a portion of a projection on a cross-plane B, indicated on FIG. 20*d*, is shown. On FIG. 20*e*, a plate 60*b* is shown pushing against a portion 25a of the shell member 25 of the support arrangement 20.

As shown on FIG. 20e, the edges of the plates pushing against circumferential face of the filter medium pack have a knife edge, and, as a result, the welding imprint 50 on the outer surface of the shell member is V-shaped. Also in the embodiment shown on FIG. 9c, the shell member 25 of the support arrangement 20 is welded to the filter medium pack by using sliding plates having a knife edge.

With reference to FIGS. 8a to 8d an isometric view, a side view, an enlarged isometric view and a portion of a projection on a cross-plane of a further example of a filter element wherein the welding is performed with sliding plates is shown. In this example, the edges of the sliding plates used for welding the shell member to the filter medium pack have a chamfered shape. As a result, the welding imprint on the outer surface of the shell member has a circumferential chamfered shape. In addition, as shown on FIG. 8c, split lines 28 or partial split-lines are visible resulting from the interface between two sliding plates used during the welding process. If four plates are used, four split lines 28 or partial split-lines are visible on the outer surface of the shell member. These split-lines 28 or partial split-lines can be construed as welding indentations.

In other embodiments, the plurality of plates are forming an iris diaphragm, which is a further example wherein plates are used for pushing a portion of the shell member against the filter medium pack during the welding process. In these embodiments, after heating the circumferential portion of the shell member, the iris diaphragm, while in an open position, is placed around the shell member 25 of the support arrangement 20. Thereafter, the iris diaphragm is closed such that edges of the plates of the iris diaphragm are pushing against the circumferential portion 25a of the shell member to be welded.

In other embodiments, after heating the circumferential portion 25a of the shell member, one or more rollers are configured to exercise a radial force while rolling the one or more rollers around the circumferential portion of the shell member and hence thereby push the heated portion of the shell member against the circumferential face 15 of the filter medium pack 10.

With reference to FIG. 22, an example is schematically shown of a thermal welding process according to the present disclosure wherein four rollers 65 are rotating around the filter medium pack 10 to press a heated circumferential portion 25a of the shell member 25 against the circumferential face of the filter medium pack. In this embodiment illustrated on FIG. 22, the filter medium pack 10 remains stationary and the rollers 65, while rotating around their axes of rotation, are moving around the filter medium pack. The solid arrows on FIG. 22 schematically illustrate a rotational direction of the rollers around their axes of rotation and the dotted arrows indicate a direction of motion of the rollers around the filter medium pack while the rollers are rotating around their axes of rotation. In other embodiments the filter medium pack 10 is configured to rotate while the rollers are stationary positioned.

As discussed above, in some embodiments as illustrated on FIG. 10a to FIG. 10c, the shell member 25 of the support arrangement 20 comprises a first shell part 26 and a second shell part 27 welded together. The method of welding the first and second shell part together such that at the same time a portion 25a of the shell member is also welded to the circumferential face 15 of the filter medium pack is further illustrated on FIG. 21a to FIG. 21d. In this embodiment, the first shell part 26 has a chamfered circumferential edge 26a, as illustrated on FIG. 21d. The second shell part 27 is positioned around the filter medium pack 10, as illustrated on FIG. 21b. During the welding process, the chamfered circumferential edge 26a of the first part 26 and an edge of the second shell part 27 are heated and then the first and second shell parts are moved in the longitudinal direction Z until the chamfered edge 26a of the first shell part 26 pushes against the edge of the second shell part. The movement direction of the first and second part is illustrated on FIG. 21b and FIG. 21c with two black arrows. In this way, the first and the second shell parts are becoming welded together and at the same time an inner plastic seam is formed between the shell member and the circumferential face 15 of the filter medium pack, resulting in a leak-tight connection.

On FIG. 10c, the dashed circle indicates the thermal welding area where a circumferential portion 25a of the shell member 25 is welded to the circumferential face 15 of the filter medium pack. In this embodiment, the thermal welding area is located at the interface between the first 26 and second 27 shell part forming the shell member 25.

In other embodiments wherein the shell member is formed by welding a first shell member to a second shell member, the edge of both the first shell part 26 and the second shell part 27 are chamfered. In further embodiments the edge of the first shell part 26 is not chamfered and only the edge of the second shell part 27 is chamfered.

Method for Moulding and Welding Single-Structure Seal Arrangements

In embodiments, as discussed above, the support arrangement is a moulded single-structure seal arrangement, wherein the shell member and a seal member are formed simultaneously by a multi-material injection molding manufacturing process. In these embodiments, the shell member of the support arrangement is forming a seal carrier for the seal member or at least a part of the shell member is forming a seal carrier for the seal member.

As a filter medium pack may suffer damage, resulting in a decrease in efficiency, if exposed to the high temperatures required for multi-material injection molding, the multi-material injection molding process for forming a seal arrangement is preferably performed prior to the thermal welding of the seal arrangement to the filter medium pack.

If the multi-material injection molding manufacturing process is performed before performing the welding process, the support arrangement 20 already comprises a seal member at the time of performing the heating of the circumferential portion of the shell member during the welding process for welding the support arrangement to the filter medium pack.

Multi-material injection molding is the process of molding two or more different materials into one single-structure part. Multi-material injection molding may include, for example, multi-component injection molding, also referred to a co-injection molding; multi-shot injection molding, and overmolding. In the multi-material injection molding process, at least a first material and second material are used, wherein the seal member includes at least the first material and the seal carrier includes least the second material. In some embodiments, the multi-material injection molding manufacturing process may include molding only two materials, but in other embodiments, more than two materials may also be used.

A variety of different permutations using a multi-material injection molding manufacturing process to form a moulded single-structure seal arrangement may be envisaged. For example, when the multi-material injection molding manufacturing process includes two-materials, the two different materials may be injected into a single mold to form a moulded single-structure seal arrangement. In this way, a moulded single-structure seal arrangement is obtained having two different regions of materials. The two different materials may be injected simultaneously (typically referred to as multi-component injection molding or co-injection molding) or sequentially (typically referred to as multi-shot injection molding) into a single mold. In an exemplary embodiment, two different types of polymers may be used as the two components, wherein one polymer forms the seal member and the other polymer forms the seal carrier or a portion thereof. Additional examples of various materials and combinations of materials that may be used for the seal member and the seal carrier are further discussed herein.

Additionally or alternatively, overmolding may be used to form a moulded single-structure seal arrangement wherein one material is layered on top of another material. If overmolding is used to form the seal member or a portion thereof or the seal carrier or a portion thereof, the overmolding is performed using an injection molding manufacturing process. Although overmolding may also be performed with polyurethane or thixotropic seals, such embodiments are not overmolding performed using an injection molding manufacturing process In some embodiments, the seal arrangement may include a third element that includes a third material that is different from the first material and the second material. The third element may be included in the seal arrangement in addition to the seal member and the seal carrier or the third element may, for example, form only a portion of the seal carrier (for example, a portion of the seal carrier that is not thermally welded to the filter medium pack. This can for example be a portion of the shell member that is not welded to the filter medium pack. In such embodiments, a three-component injection molding manufacturing process may be used to form the seal arrangement. Alternatively, a two-component injection molding manufacturing process may be used to form a portion of the seal arrangement and overmolding may be used for form the remainder of the seal arrangement.

Using multi-material injection molding allows for the formation and/or joining of the seal member and the seal carrier without the use of a curable adhesive. The use of a curable adhesive requires curing time, thereby increasing manufacturing time. Thus, using multi-material injection molding allows for faster production of the filter element. In addition, the use of multi-material injection molding instead of a curable adhesive such as polyurethane provides the seal member with greater stability and more dimensional stability, providing less risk of a leak during use and providing increased potential configurations and geometries for the location and orientation of the seal member.

In embodiments wherein the support arrangement is a moulded single-structure seal arrangement, the preferred processing temperature for welding the support arrangement to the filter medium pack, may be selected by a person having skill in the art with reference to the glass transition temperature of the material forming the seal member, the glass transition temperature of the material that forms the shell member and/or the circumferential portion of the shell member to be attached to the filter medium pack, the heating technique being applied for heating the circumferential portion of the shell member, and the configuration of the seal arrangement.

In some embodiments, the glass transition temperature of a first material, or combination of materials, used to form seal member may be greater than a glass transition temperature of a second material, or combination of materials, used to form the shell member and/or to form the circumferential portion of the shell member. In this way, when heat is applied to the shell member or the circumferential portion of the shell member during the thermal welding manufacturing process, and the processing temperature is above the glass transition temperature of the second material, the seal member is less likely to be deformed.

The difference in glass transition temperature between the materials for the seal member and the seal carrier may be selected by a person having skills in the art based on the geometry of the seal arrangement, the heat source used, and the processing temperature. In some embodiments, the processing temperature may be at least 5° C., at least 10° C., at least 15° C., at least 20° C., at least 25° C., at least 30° C., at least 35° C., at least 40° C., at least 45° C., or at least 50° C. greater than the glass transition temperature of the second material. In some embodiments, the processing temperature may be up to 50° C., up to 75° C., up to 100° C., up to 125° C., up to 150° C., up to 175° C., or up to 200° C. greater than the glass transition temperature of the second material.

REFERENCE NUMBERS

| | |
|---|---|
| 1 | Filter element |
| 5 | Layer of filter material |
| 5a | First corrugated sheet |
| 5b | Second non-corrugated sheet |
| 10 | Filter medium pack |
| 11 | Fluid inlet flow face |
| 12 | Fluid outlet flow face |
| 13 | plastic wrap |
| 15 | circumferential face of the filter medium pack |
| 19 | spacing |
| 20, 20a, 20b | Support arrangement |
| 21 | handle |
| 22 | anti-telescope member |
| 23 | notch |
| 24 | flange member |
| 25 | Shell member |
| 25a, 25b | welded portion of the shell member |
| 25c | chamfered portion of the shell member |
| 26 | First part of a shell member |
| 26a, 40a | Chamfered edge |
| 27 | Second part of a shell member |
| 28 | Split-line |
| 29 | Seal member |
| 30 | Hot plate |
| 40 | Chamfered jig |
| 50 | Circumferential imprint |
| 60a, 60b, 60c, 60d | sliding plate |
| 65 | roller |

What is claimed is:

1. A filter element comprising:
a filter medium pack comprising a circumferential face extending in a longitudinal direction from a fluid inlet flow face to an opposing fluid outlet flow face; and
a support arrangement comprising a shell member extending in the longitudinal direction, and wherein the shell member is circumscribing at least a part of the circumferential face of the filter medium pack;
wherein at least a portion of the shell member is thermally welded to the circumferential face of the filter medium pack.

2. The filter element of claim 1, wherein the filter medium pack comprises coiled layers of filter material, and wherein said circumferential face of the filter medium pack is an outer surface of an outer layer of said coiled layers of filter material.

3. The filter element of claim 2, wherein the filter material comprises cellulose fibers, synthetic fibers, or a combination of both.

4. The filter element of claim 1, wherein the filter medium pack comprises coiled layers of filter material, wherein an outer layer of the coiled layers is covered by a plastic wrap, and wherein an outer surface of said plastic wrap is forming said circumferential face of the filter medium pack.

5. The filter element of claim 1, wherein the filter medium pack comprises fluted filter media, preferably wherein flutes are formed by securing a first corrugated sheet to a second non-corrugated sheet.

6. The filter element of claim 1, wherein the thermally welded portion of the shell member is a circumferential portion forming a circumferential leak-tight joint between the shell member and the circumferential face of the filter medium pack.

7. The filter element of claim 6, wherein a separation distance measured along the longitudinal direction from the fluid inlet flow face to the circumferential leak-tight joint is varying as function of an azimuthal angular position of the leak-tight joint on the filter medium pack, preferably said separation distance is varying between a minimum and a maximum separation distance.

8. The filter element of claim 6, wherein said circumferential leak-tight joint is spaced from said fluid inlet flow face and spaced from said fluid outlet flow face with $$S_{IN} > 0.05 \times H \text{ and } S_{OUT} > 0.05 \times H,$$

preferably $S_{IN} > 0.10 \times H$ and $S_{OUT} > 0.10 \times H$ wherein $S_{IN}$ and $S_{OUT}$ is a separation distance measured along the longitudinal direction between the leak-tight joint and, respectively, the inlet and outlet flow face, and wherein His a filter medium pack height measured along the longitudinal direction between the inlet flow face and the outlet flow face.

9. The filter element of claim 1, wherein an outer surface of the shell member comprises a welding circumferential imprint, a welding partly-circumferential imprint, one or more individual welding indentations, or a combination of one or more individual welding indentations with a welding circumferential imprint or with a welding partly-circumferential imprint.

10. The filter element of claim 1, wherein the thermal welding of the portion of the shell member comprises: heating the portion of the shell member to be welded, pushing the heated portion or at least part of the heated portion against the circumferential face of the filter medium pack, and allowing the heated portion of the shell member to cool down.

11. The filter element of claim 1, wherein the shell member or at least the portion of the shell member thermally welded to the circumferential face of the filter medium pack is made of a thermoplastic material, preferably the thermoplastic material is any the following list of materials or mixtures and combinations thereof:
acrylonitrile butadiene styrene, polypropylene, polyamide, polyethylene terephthalate, polylactic acid, polyethylene, polycarbonate, polystyrene, or polyvinyl chloride.

12. The filter element of claim 1, wherein the support arrangement is a seal arrangement and wherein the shell member or at least a part of the shell member is forming a seal carrier for supporting a seal member for sealing the filter element to a housing of a filter system.

13. The filter element of claim 1, wherein the support arrangement is a moulded single-structure seal arrangement comprising said shell member and further comprising a seal member for sealing the filter element to a housing of a filter system, and wherein the shell member or at least a part of the shell member is forming a seal carrier for said seal member.

14. The filter element according to claim 13, wherein the seal member comprises a first material and the shell member, or at least the portion of the shell member welded to the circumferential face of the filter medium pack, comprises a second material, and wherein the second material is different from the first material.

15. A method of manufacturing a filter element comprising a filter medium pack having a circumferential face extending in a longitudinal direction from a fluid inlet flow face to an opposing fluid outlet flow face, the method comprising:
providing a support arrangement comprising a shell member configured for circumscribing the circumferential face or at least a part of the circumferential face of the filter medium pack;
heating at least a portion of the shell member;
positioning the shell member around the circumferential face of the filter medium pack;
pushing the heated portion of the shell member or at least part of the heated portion of the shell member against the circumferential face of the filter medium pack; and
allowing the circumferential portion of the shell member to cool down.

16. The method of claim 15, wherein the heating of the portion of the shell member is performed prior to positioning the shell member around the circumferential face of the filter medium pack, or alternatively, wherein the heating of the portion of the shell member is performed after positioning the shell member around the circumferential face of the filter medium pack.

17. The method of claim 15, wherein the heated portion is a circumferential portion of the shell member such that when pushing the heated portion of the shell member against the circumferential face of the filter medium pack, a circumferential spacing between the shell member and the circumferential face of the filter medium pack becomes sealed off.

18. The method of claim 17, wherein the heated portion of the shell member corresponds to a circumferential edge of the shell member, and wherein said pushing the heated portion of the shell member or at least part of the heated portion of the shell member against the circumferential face of the filter medium pack comprises:
providing a jig element comprising a circumferential chamfered edge configured for encircling the circumferential face of the filter medium pack;
positioning the jig element with respect to the filter medium pack such that the circumferential chamfered edge of the jig element is encircling the circumferential face of the filter medium pack and is facing in the longitudinal direction towards the circumferential edge of the shell member; and
relatively moving the shell member with respect to the jig element along the longitudinal direction until the chamfered edge of the jig element pushes against the heated circumferential edge of the shell member and at least a portion of the heated circumferential edge is guided towards the circumferential face of the filter medium pack and thereby fills up said circumferential spacing between the shell member and the circumferential face of the filter medium pack.

19. The method of claim 18, wherein heating of the circumferential edge comprises:
placing a hot plate under the shell member such that the circumferential edge of the shell member comes in contact with the hot plate and heats up.

20. The method of claim 17, wherein said pushing the heated portion or at least part of the heated portion of the shell member against the circumferential face of the filter medium pack comprises:
positioning a plurality of plates around the shell member such that the plates are transverse with respect to said longitudinal axis; and
moving the plurality of plates such that edge portions of the plates are pushing against the heated circumferential portion of the shell member.

\* \* \* \* \*